United States Patent
Nio et al.

(10) Patent No.: US 6,429,899 B1
(45) Date of Patent: Aug. 6, 2002

(54) VIDEO DISPLAY APPARATUS WITH SCAN CONVERSION AND REVERSION AND A VIDEO DISPLAY METHOD USING SCAN CONVERSION AND REVERSION

(75) Inventors: Yutaka Nio; Naoji Okumura; Katsumi Terai, all of Osaka; Kazuto Tanaka, Shiga; Satoshi Okamoto, Osaka; Masaaki Fujita, Osaka; Minoru Miyata, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/351,847

(22) Filed: Jul. 13, 1999

(30) Foreign Application Priority Data

Jul. 16, 1998 (JP) .............................. 10-201591

(51) Int. Cl.[7] .............................................. H04N 11/00
(52) U.S. Cl. ........................................ 348/443; 206/441
(58) Field of Search ................................ 348/448, 458, 348/441, 553, 578, 206, 459, 806

(56) References Cited

U.S. PATENT DOCUMENTS 3,662,102 A * 5/1972 Herndon ..................... 348/441
5,267,045 A * 11/1993 Stroomer .................... 348/441
5,663,615 A * 9/1997 Ogino ........................ 348/806

FOREIGN PATENT DOCUMENTS

GB    2 137 844 A    10/1984

OTHER PUBLICATIONS

G. Hirtz, "Symmetrical Deflection For Future IDTV/HDTV Receivers", Proceedings Of The International Conference On Consumer Electronics, Rosemont, pp. 38/39, IEEE—Jun. 8,1993.

Hirtz et al., IEEE Trans. on Consumer Electronics, vol. 39, No. 3, Aug. 1993: "*Symmetrical Deflection for Future IDTV/HDTV Receivers*".

* cited by examiner

*Primary Examiner*—Victor R. Kostak
(74) *Attorney, Agent, or Firm*—Akin, Gump, Strauss, Hauer & Feld, L.L.P.

(57) ABSTRACT

A video signal of an interlaced scanning system having 525 scanning lines and a vertical scanning frequency of 60 Hz is converted to a video signal having 1050 scanning lines and a vertical scanning frequency of 120 Hz, for displaying an image by bidirectional scanning. A vertical synchronizing signal is subjected to offset processing by a ¼ horizontal scanning period when an odd field is started, thereby keeping interlaced relation between odd and even fields. The vertical synchronizing signal is subjected to offset processing by a ½ horizontal scanning period every frame, so that the scanning direction for each scanning line is reversed every frame.

10 Claims, 24 Drawing Sheets

FIG. 6
1048I/120Hz
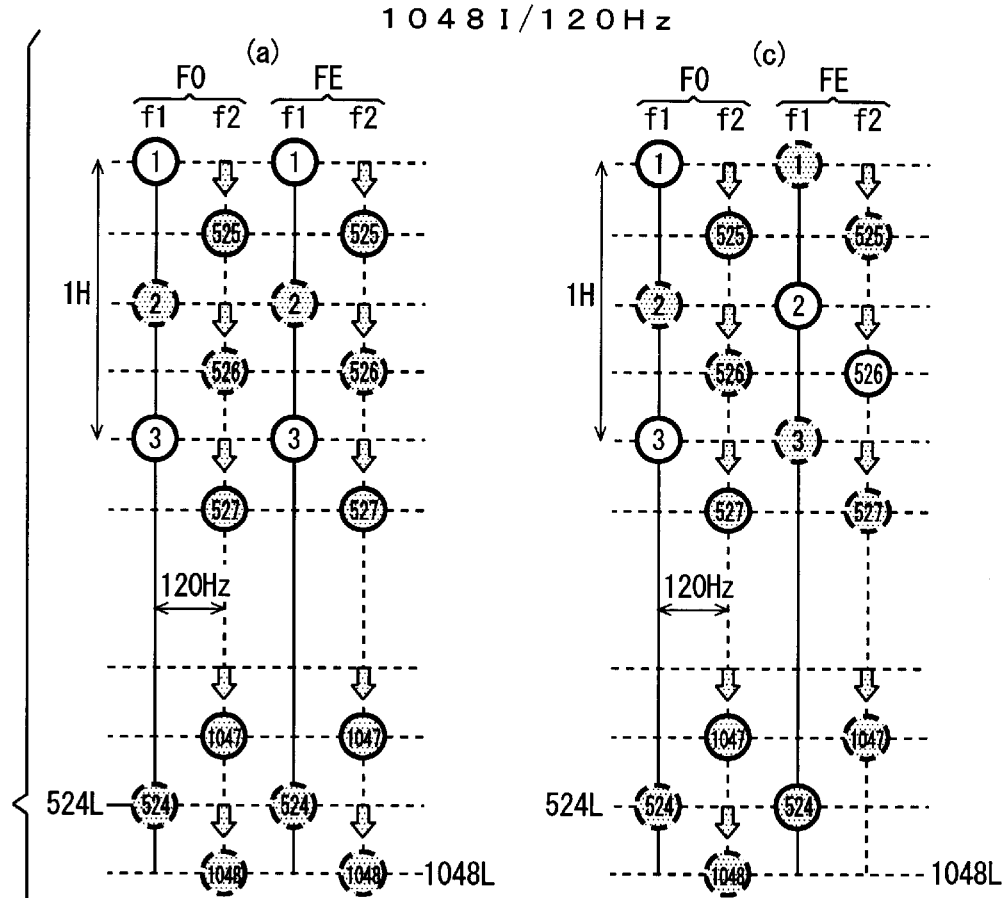
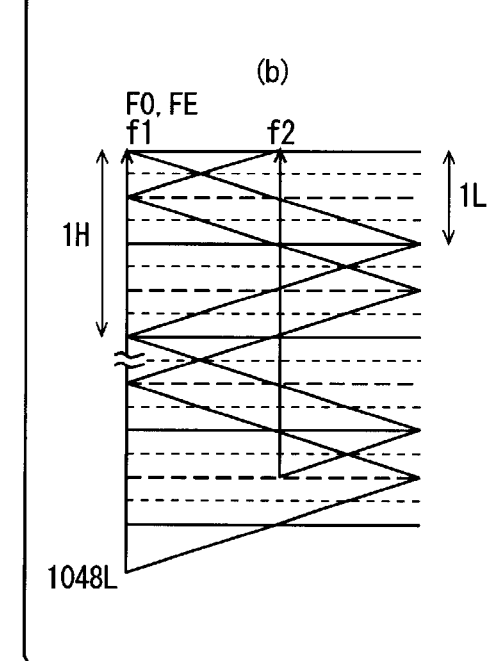
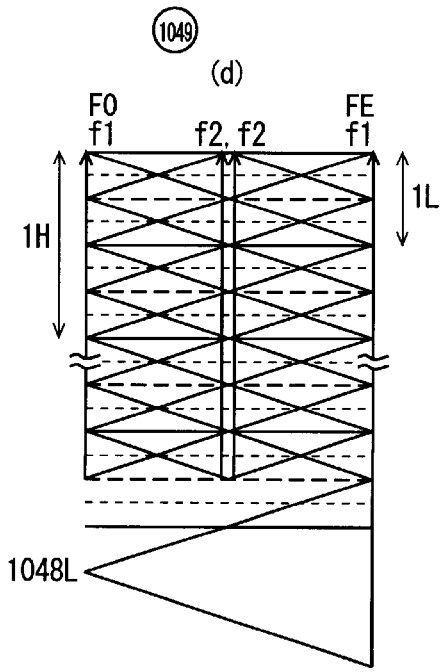

524P/60Hz

524I/120Hz

F I G. 9
526I/120Hz
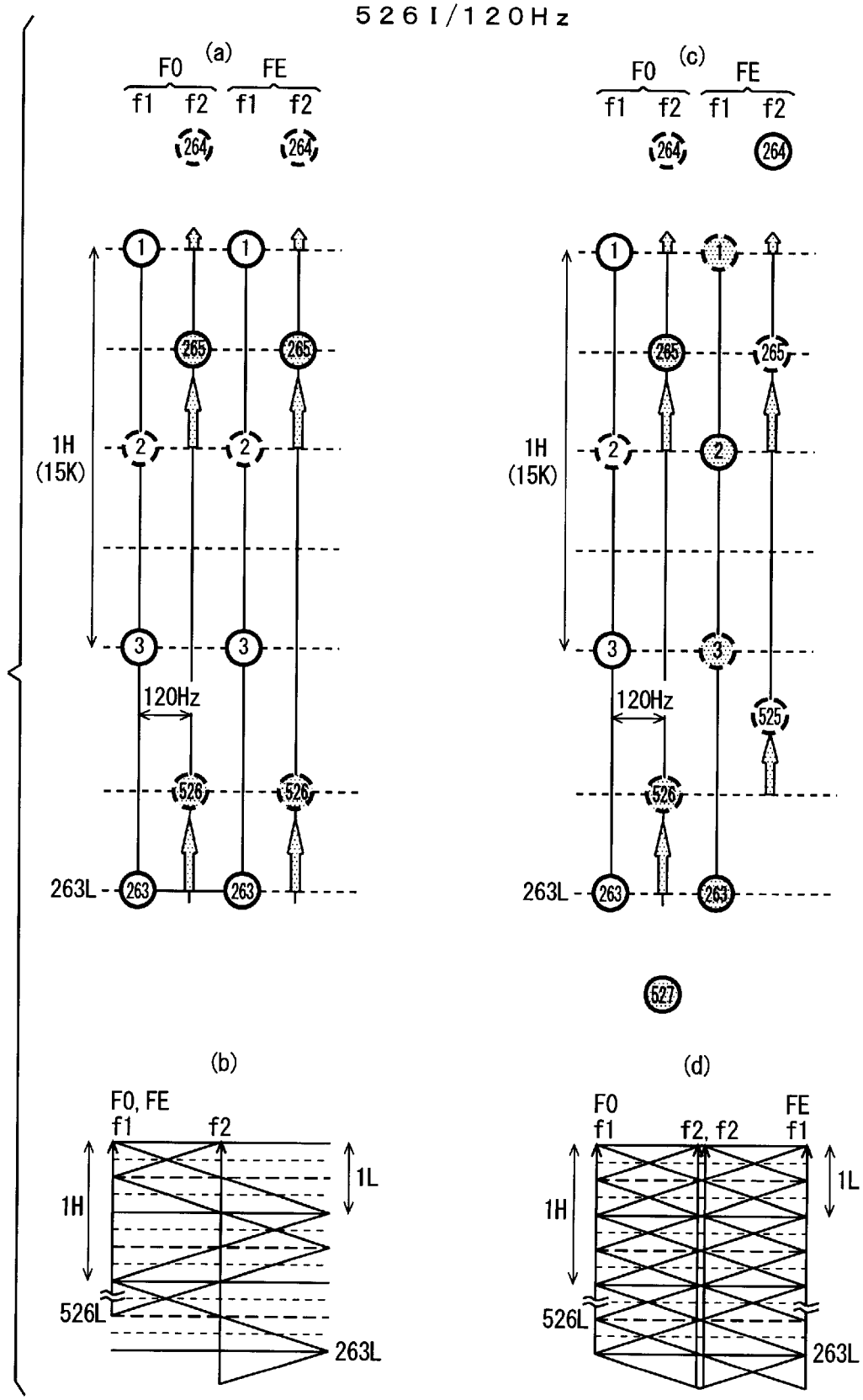

FIG. 12
1125I/60Hz
(a)
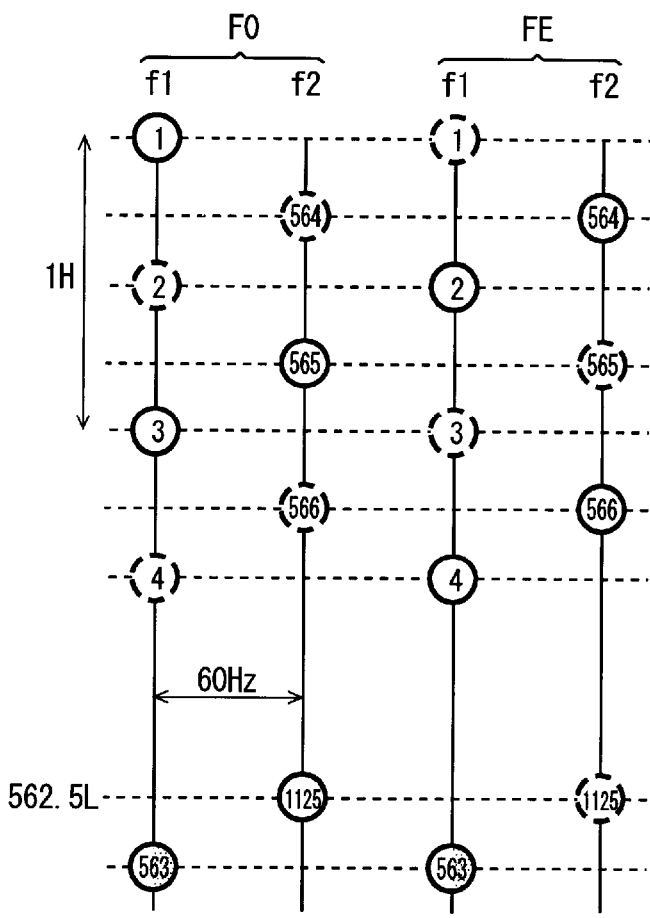
(b)
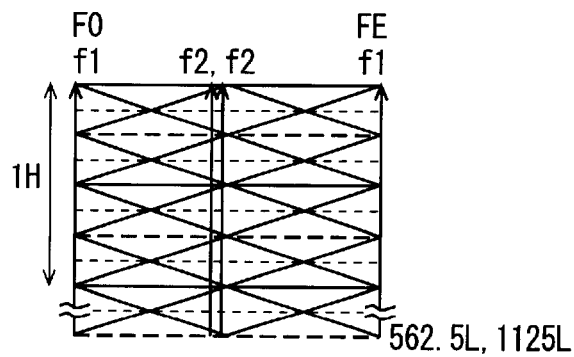

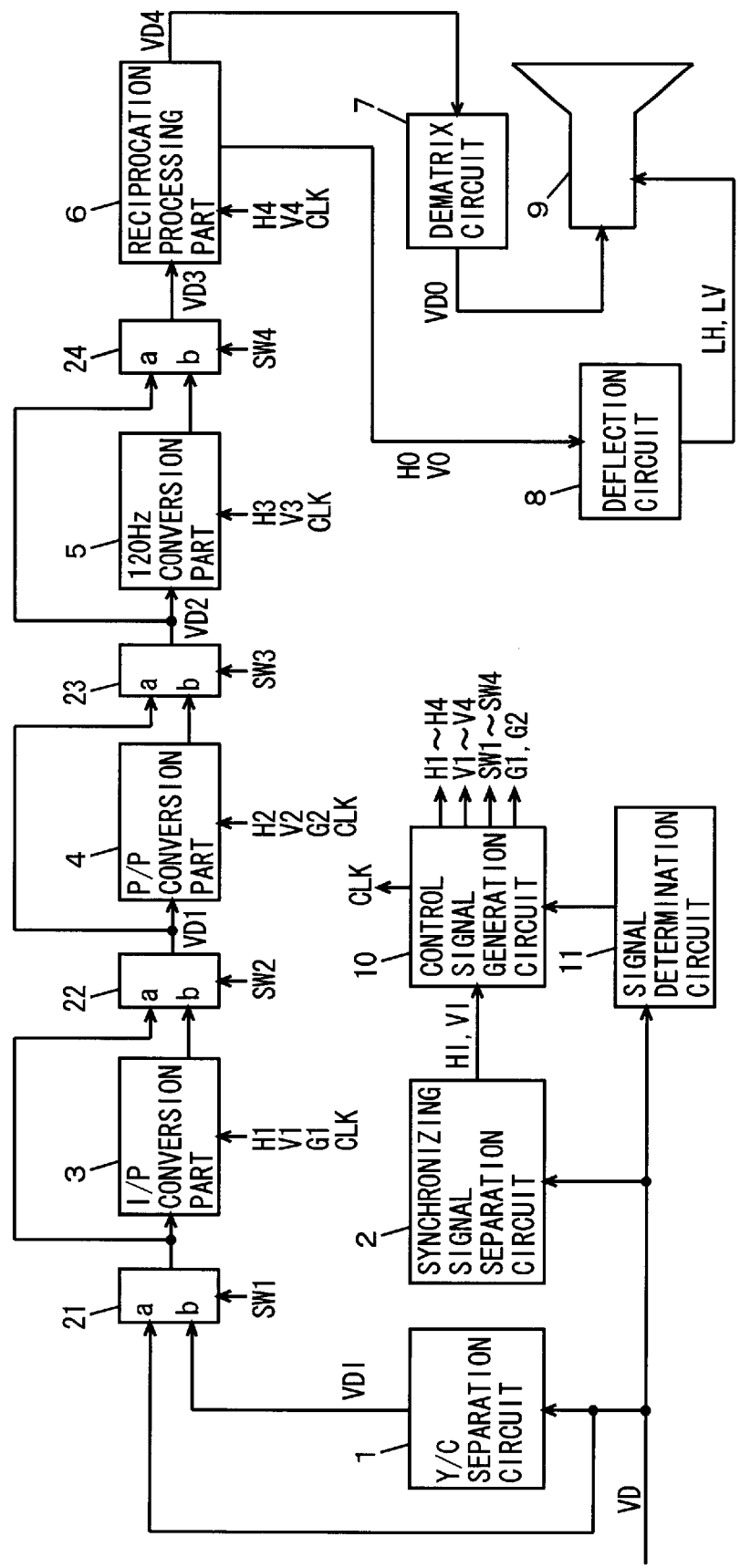
F I G. 15

VIDEO DISPLAY APPARATUS WITH SCAN CONVERSION AND REVERSION AND A VIDEO DISPLAY METHOD USING SCAN CONVERSION AND REVERSION

BACKGROUND OF THE INVENTION

1. Field of the Invention

The present invention relates to a video display apparatus and a video display method displaying an image by a bidirectional scanning system.

2. Description of the Prior Art

In a conventional video display apparatus such as a television receiver or a display monitor, a unidirectional scanning system is generally employed.

FIG. 23 illustrates a conventional unidirectional progressive scanning system (sequential scanning system). In the unidirectional progressive scanning system, scanning is performed on a screen slightly obliquely downward from left to right, as shown in FIG. 23. In the progressive scanning system with 525 scanning lines, the horizontal scanning frequency is 31.5 KHz and the horizontal scanning period is 31.75 $\mu$m. The frame frequency is 30 Hz, and the vertical scanning frequency is 30 Hz.

FIG. 24 illustrates a conventional unidirectional interlaced scanning system. In the unidirectional interlaced scanning system, odd numbered scanning lines are scanned in first fields as shown by solid lines, and even numbered scanning lines are scanned in second fields as shown by one-dot chain lines in FIG. 24. A single complete image is displayed by scanning of one frame consisting of a first field and a second field. In the interlaced scanning system with 525 scanning lines, the horizontal scanning frequency is 31.5 KHz and the horizontal scanning period is 31.75 $\mu$s. The frame frequency is 30 Hz, the field frequency is 60 Hz, and the vertical scanning frequency is 60 Hz.

A bidirectional scanning system is recently proposed for attaining higher picture quality. FIG. 25 illustrates a bidirectional progressive scanning system. As shown in FIG. 25, odd numbered scanning lines are horizontally scanned from left to right on a screen, and even numbered scanning lines are scanned from right to left on the screen.

In the bidirectional scanning system, the density of the scanning lines is doubled in the vertical direction, to increase the resolution and improve the brightness. Further, power for deflecting an electron beam is reduced due to reciprocating deflection, and a power circuit can be reduced in scale.

However, a generally employed video signal is processed in accordance with the unidirectional progressive scanning system or the unidirectional interlaced scanning system, and hence a conventional video display apparatus cannot directly display an input video signal in the bidirectional scanning system.

In this regard, awaited are a video display apparatus and a video display method capable of displaying a video signal of the unidirectional progressive scanning system or the unidirectional interlaced scanning system in the bidirectional scanning system.

When converting such a video signal of the unidirectional scanning system to that of the bidirectional scanning system, a conversion method responsive to the type of the original video signal must be applied in order to improve the picture quality.

SUMMARY OF THE INVENTION

An object of the present invention is to provide a video display apparatus and a video display method capable of displaying a video signal of a unidirectional progressive scanning system or a unidirectional interlaced scanning system as an image of high picture quality in a bidirectional scanning system.

A video display apparatus according to an aspect of the present invention comprises a conversion circuit, a scanning line reversion circuit and a display part. The conversion part receives a first video signal of an interlaced scanning system or a progressive scanning system including a first number of scanning lines in each frame and having a first vertical scanning frequency, and converts the first video signal to a second video signal of a progressive scanning system including a second number of scanning lines in each frame and having a second vertical scanning frequency. The scanning line reversion circuit alternately reverses the time base of the second video signal output from the conversion circuit every scanning line and outputs the processed second video signal as a third video signal. The display part displays the third video signal output from the scanning line reversion circuit by bidirectional scanning in synchronization with a vertical synchronizing signal and a horizontal synchronizing signal after conversion by the conversion circuit.

In the video display apparatus, the first video signal of an interlaced scanning system or a progressive scanning system including the first number of scanning lines in each frame and having the first vertical scanning frequency is converted to the second video signal of a progressive scanning system including the second number of scanning lines in each frame and having the second vertical scanning frequency. The time base of the second video signal is alternately reversed every scanning line, and the processed second video signal is output as the third video signal. Further, the third video signal is displayed by bidirectional scanning in synchronization with the vertical synchronizing signal and the horizontal synchronizing signal after conversion by the conversion circuit. Thus, a video signal of a unidirectional interlaced scanning system or a unidirectional progressive scanning system is displayed as an image of high picture quality in a bidirectional scanning system.

The first number may be an odd number. In this case, a video signal of an interlaced scanning system or a progressive scanning system including the odd number of scanning lines in each frame and having the first vertical scanning frequency is displayed by bidirectional scanning with the second number of scanning lines and the second vertical scanning frequency.

The first number may be an even number. In this case, a video signal of an interlaced scanning system or a progressive scanning system including an even number of scanning lines in each frame and having the first vertical scanning frequency is displayed by bidirectional scanning with the second number of scanning lines and the second vertical scanning frequency.

The video display apparatus may further comprise a first offset circuit displacing the vertical synchronizing signal by a first offset time every frame.

In this case, the scanning direction for each scanning line can be alternately reversed every frame by setting the first offset time at a prescribed value. Thus, even if an error occurs between the forward scanning time and the backward scanning time or between the brightness of forward scanning lines and that of backward scanning lines, such an error is averaged on the time base to cause no deterioration of the picture quality. Thus, design accuracy for the display part is relaxed.

The first offset time may be half a horizontal scanning period. In this case, the scanning direction for each scanning line is alternately reversed every frame.

The second vertical scanning frequency may be equal to the first vertical scanning frequency. In this case, a video signal of an interlaced scanning system or a progressive scanning system including the first number of scanning lines in each frame and having the first vertical scanning frequency is displayed by bidirectional scanning with the second number of scanning lines and the same vertical scanning frequency as the first vertical scanning frequency.

The second vertical scanning frequency may be even times the first vertical scanning frequency. In this case, a video signal of an interlaced scanning system or a progressive scanning system including the first number of scanning lines in each frame and having the first vertical scanning frequency is displayed by bidirectional scanning with the second number of scanning lines and a vertical scanning frequency even times the first vertical scanning frequency.

The video display apparatus may further comprise a second offset circuit displacing the vertical synchronizing signal so that a plurality of fields included in each frame keep interlaced relation.

In this case, the vertical synchronizing signal is so displaced that the plurality of fields included in each frame can keep interlaced relation. Thus, the picture quality can be improved.

The second vertical scanning frequency may be twice the first vertical scanning frequency, and the second offset circuit may displace the vertical synchronizing signal by a second offset time every other field of each frame.

In this case, a video signal of an interlaced scanning system or a progressive scanning system including the first number of scanning lines in each frame and having the first vertical scanning frequency is displayed by bidirectional scanning with the second number of scanning lines and the vertical scanning frequency twice the first vertical scanning frequency, while odd and even fields of each frame can keep interlaced relation. Thus, the picture quality can be improved.

The second offset time may be ¼ the horizontal scanning period. Thus, odd and even fields of each frame can keep interlaced relation.

The second number may be even times the first number. In this case, a video signal of an interlaced scanning system or a progressive scanning system is displayed by bidirectional scanning with scanning lines of even times. Thus, the picture quality can be improved.

The second number may be equal to the first number. In this case, a video signal of an interlaced scanning system or a progressive scanning system is displayed by bidirectional scanning with the same number of scanning lines.

The first video signal may be of an interlaced scanning system, the first number may be an odd number, the first vertical scanning frequency may be even times the second vertical scanning frequency, each frame may include a plurality of fields, and the vertical synchronizing signal may be displaced so that the plurality of fields of each frame keep interlaced relation.

In this case, a video signal of an interlaced scanning system including an odd number of scanning lines in each frame and having the first vertical scanning frequency is displayed by bidirectional scanning with the second number of scanning lines and a vertical scanning frequency even times the first vertical scanning frequency, while the plurality of fields of each frame can keep interlaced relation. Thus, a high picture quality is attained.

A video display method according to another aspect of the present invention includes steps of receiving a first video signal of an interlaced scanning system or a progressive scanning system including a first number of scanning lines in each frame and having a first vertical scanning frequency and converting the first video signal to a second video signal of a progressive scanning system including a second number of scanning lines in each frame and having a second vertical scanning frequency, alternately reversing the time base of the second video signal every scanning line and outputting the processed second video signal as a third video signal, and displaying the third video signal by bidirectional scanning in synchronization with a vertical synchronizing signal and a horizontal synchronizing signal after conversion.

In the video display method, the first video signal of an interlaced scanning system or a progressive scanning system including the first number of scanning lines in each frame and having the first vertical scanning frequency is converted to the second video signal of a progressive scanning system including the second number of scanning lines in each frame and having the second vertical scanning frequency. The time base of the second video signal is alternately reversed every scanning line, and the processed second video signal is output as the third video signal. Further, the third video signal is displayed by bidirectional scanning in synchronization with the vertical synchronizing signal and the horizontal synchronizing signal after conversion. Thus, a video signal of a unidirectional interlaced scanning system or a unidirectional progressive scanning system is displayed in a bidirectional scanning system as an image of high picture quality.

The first number may be an odd number. In this case, a video signal of an interlaced scanning system or a progressive scanning system including an odd number of scanning lines in each frame and having the first vertical scanning frequency is displayed by bidirectional scanning with the second number of scanning lines and the second vertical scanning frequency.

The first number may be an even number. In this case, a video signal of an interlaced scanning system or a progressive scanning system including an even number of scanning lines in each frame and having the first vertical scanning frequency is displayed by bidirectional scanning with the second number of scanning lines and the second vertical scanning frequency.

The video display method may further include a step of displacing the vertical synchronizing signal by a first offset time every frame.

In this case, the scanning direction for each scanning line can be alternately reversed every frame by setting the first offset time at a prescribed value. Thus, even if an error occurs between the forward scanning time and the backward scanning time or between the brightness of forward scanning lines and that of backward scanning lines, such an error is averaged on the time base to cause no deterioration of the picture quality. Thus, design accuracy for a display part is relaxed.

The first offset time may be half a horizontal scanning period. In this case, the scanning direction for each scanning line is alternately reversed every frame.

The second vertical scanning frequency may be equal to the first vertical scanning frequency. In this case, a video signal of an interlaced scanning system or a progressive scanning system including the first number of scanning lines in each frame and having the first vertical scanning frequency is displayed by bidirectional scanning with the second number of scanning lines and the same vertical scanning frequency as the first vertical scanning frequency.

The second vertical scanning frequency may be even times the first vertical scanning frequency. In this case, a video signal of an interlaced scanning system or a progressive scanning system including the first number of scanning lines in each frame and having the first vertical scanning frequency is displayed by bidirectional scanning with the second number of scanning lines and a vertical scanning frequency even times the first vertical scanning frequency.

The video display method may further include a step of displacing the vertical synchronizing signal so that a plurality of fields included in each frame keep interlaced relation.

In this case, the vertical synchronizing signal is so displaced that the plurality of fields included in each frame can keep interlaced relation. Thus, the picture quality can be improved.

The second vertical scanning frequency may be twice the first vertical scanning frequency, and the step of displacing the vertical synchronizing signal may include a step of displacing the vertical synchronizing signal by a second offset time every other field of each frame.

In this case, a video signal of an interlaced scanning system or a progressive scanning system including the first number of scanning lines in each frame and having the first vertical scanning frequency is displayed by bidirectional scanning with the second number of scanning lines and the vertical scanning frequency twice the first vertical scanning frequency, while odd and even fields of each frame can keep interlaced relation. Thus, the picture quality can be improved.

The second offset time may be ¼ a horizontal scanning period. Thus, odd and even fields of each frame can keep interlaced relation.

The second number may be even times the first number. In this case, a video signal of an interlaced scanning system or a progressive scanning system is displayed by bidirectional scanning with scanning lines of even times. Thus, the picture quality can be improved.

The second number may be equal to the first number. In this case, a video signal of an interlaced scanning system or a progressive scanning system is displayed by bidirectional scanning with the same number of scanning lines.

The first video signal may be of an interlaced scanning system, the first number may be an odd number, the first vertical scanning frequency may be even times the second vertical scanning frequency, each frame may include a plurality of fields, and the video display method may further include a step of displacing the vertical synchronizing signal so that the plurality of fields of each frame keep interlaced relation.

In this case, a video signal of an interlaced scanning system including an odd number of scanning lines in each frame and having the first vertical scanning frequency is displayed by bidirectional scanning with the second number of scanning lines and a vertical scanning frequency even times the first vertical scanning frequency, while the plurality of fields of each frame can keep interlaced relation. Thus, a high picture quality is attained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6(a) to 6(d) are conceptual diagrams showing a video display method according to a sixth embodiment of the present invention;

FIGS. 9(a) to 9(d) are conceptual diagrams showing a video display method according to a ninth embodiment of the present invention;

FIGS. 12(a) and 12(b) are conceptual diagrams showing a video display method according to a twelfth embodiment of the present invention;

FIG. 15 is a block diagram showing the structure of a video display apparatus implementing the video display methods according to the first to thirteenth embodiments of the present invention;

DESCRIPTION OF THE PREFERRED EMBODIMENTS

Figure 1:
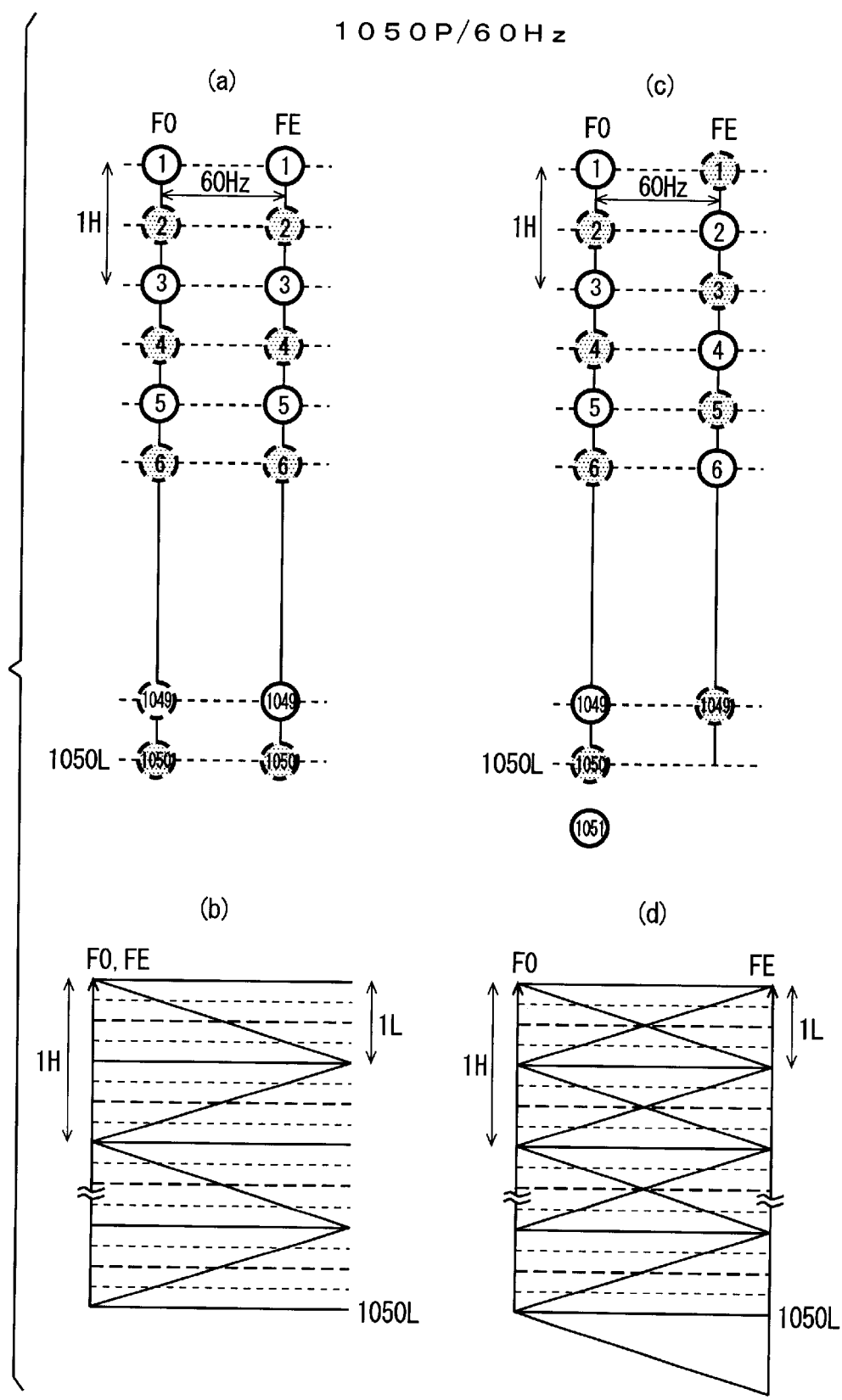
FIGS. 1(a) to 1(d) are conceptual diagrams showing a video display method according to a first embodiment of the present invention.
Figure 2:
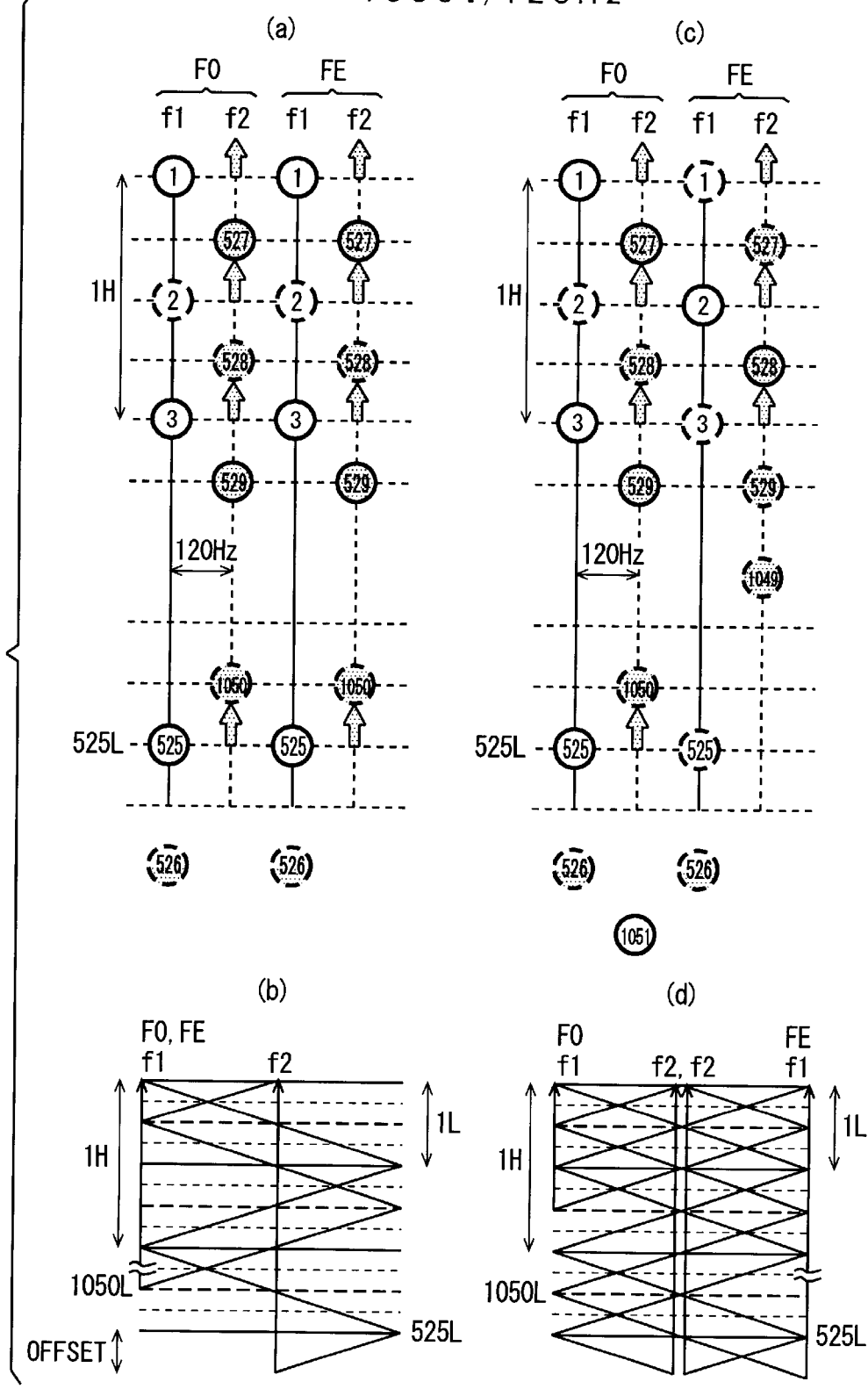
FIGS. 2(a) to 2(d) are conceptual diagrams showing a video display method according to a second embodiment of the present invention.
Figure 3:
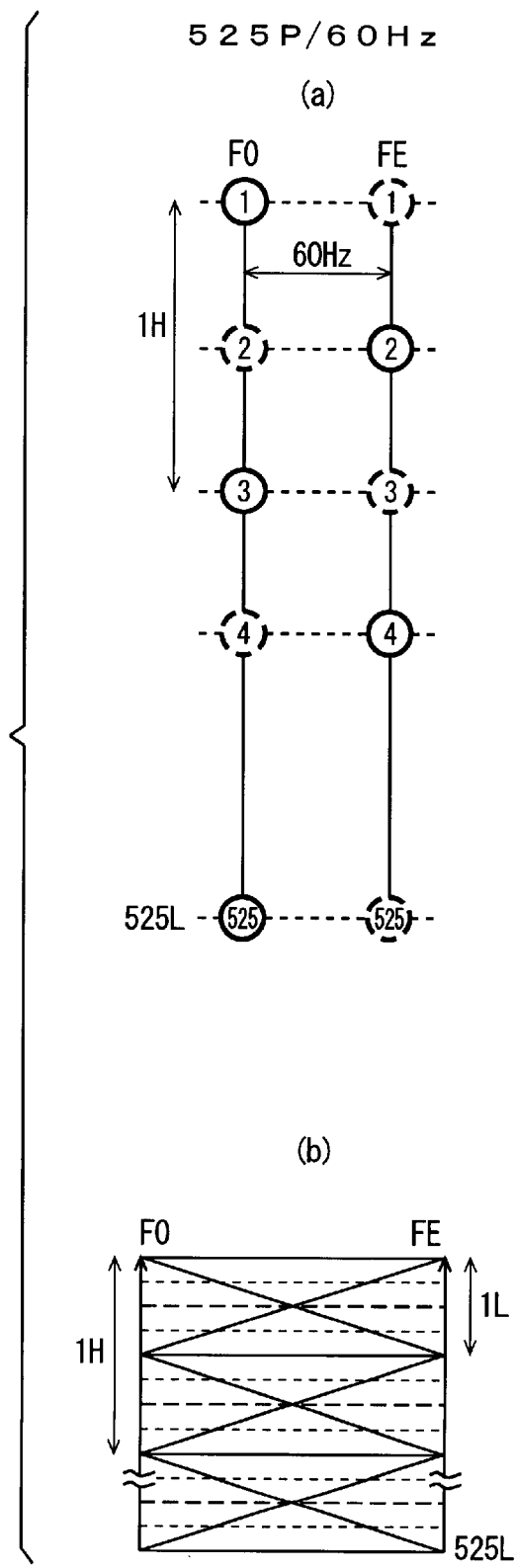
FIGS. 3(a) and 3(b) are conceptual diagrams showing a video display method according to a third embodiment of the present invention.
Figure 4:
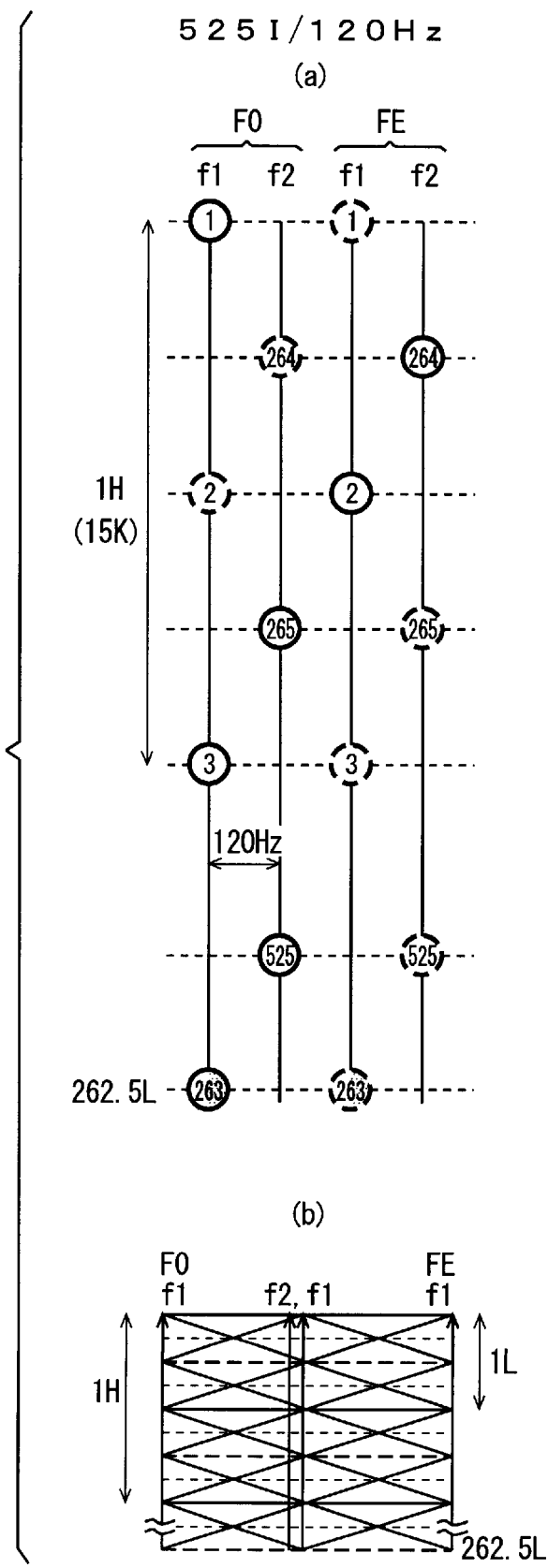
FIGS. 4(a) and 4(b) are conceptual diagrams showing a video display method according to a fourth embodiment of the present invention.
Figure 5:
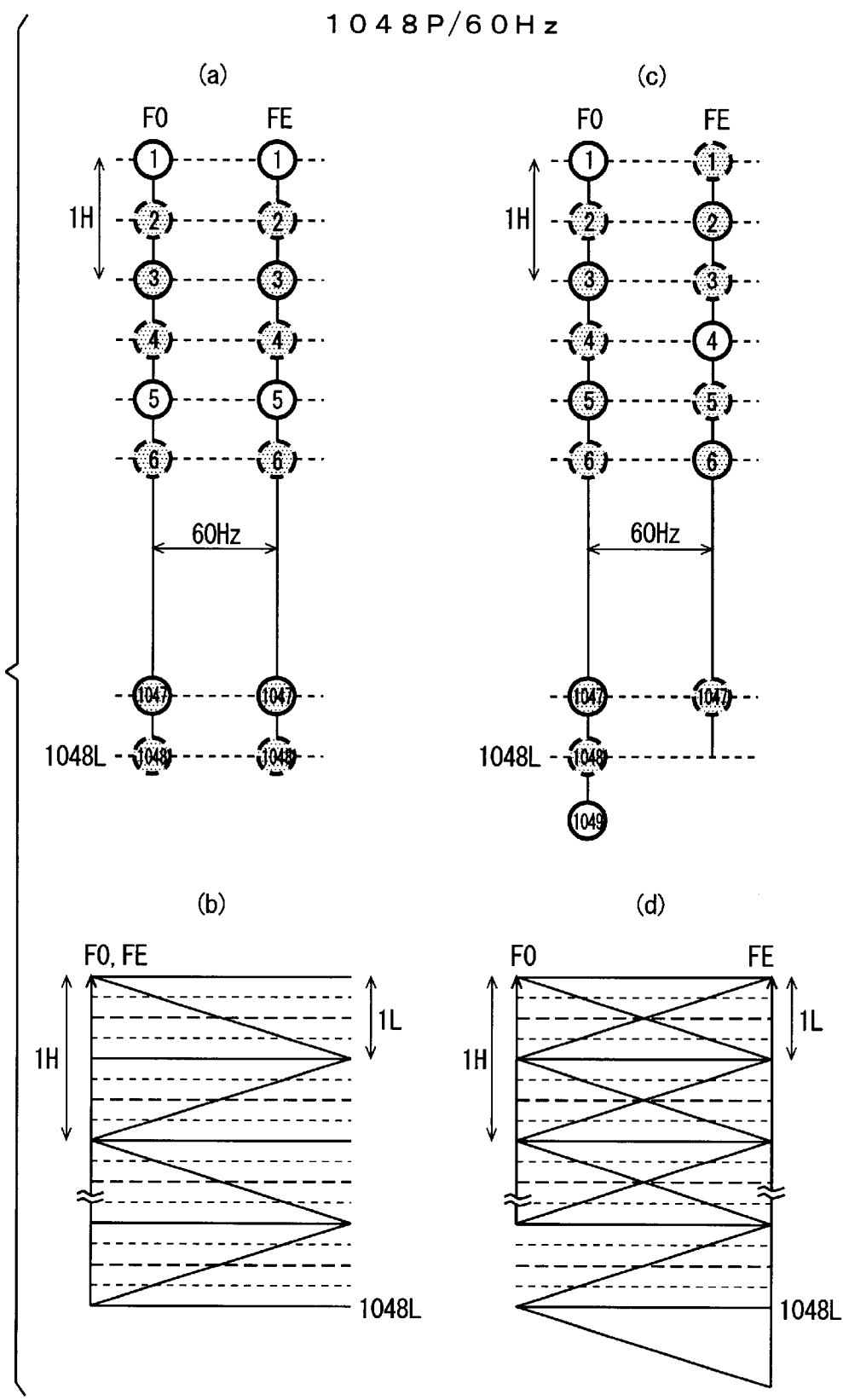
FIGS. 5(a) to 5(d) are conceptual diagrams showing a video display method according to a fifth embodiment of the present invention.
Figure 7:
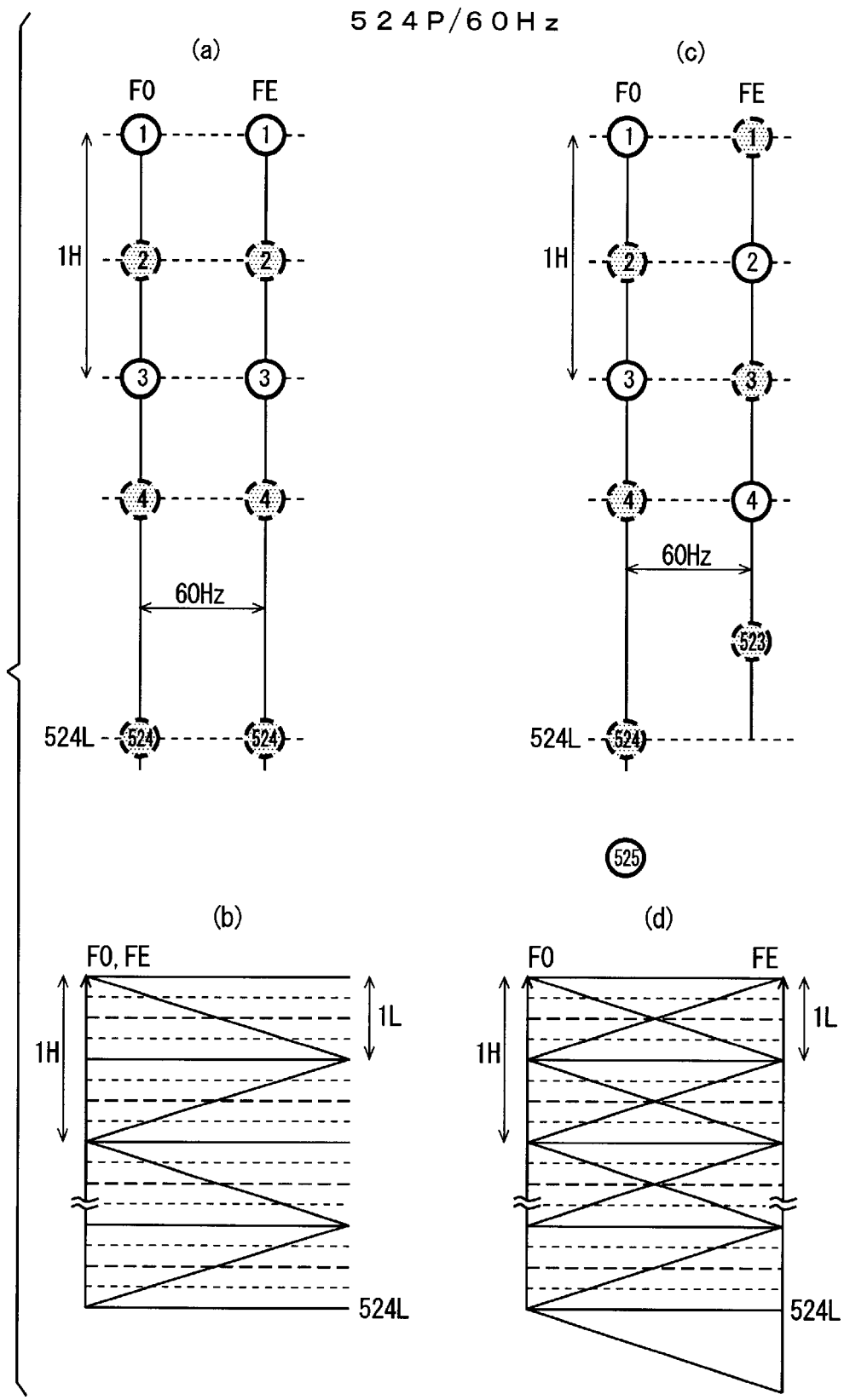
FIGS. 7(a) to 7(d) are conceptual diagrams showing a video display method according to a seventh embodiment of the present invention.
Figure 8:
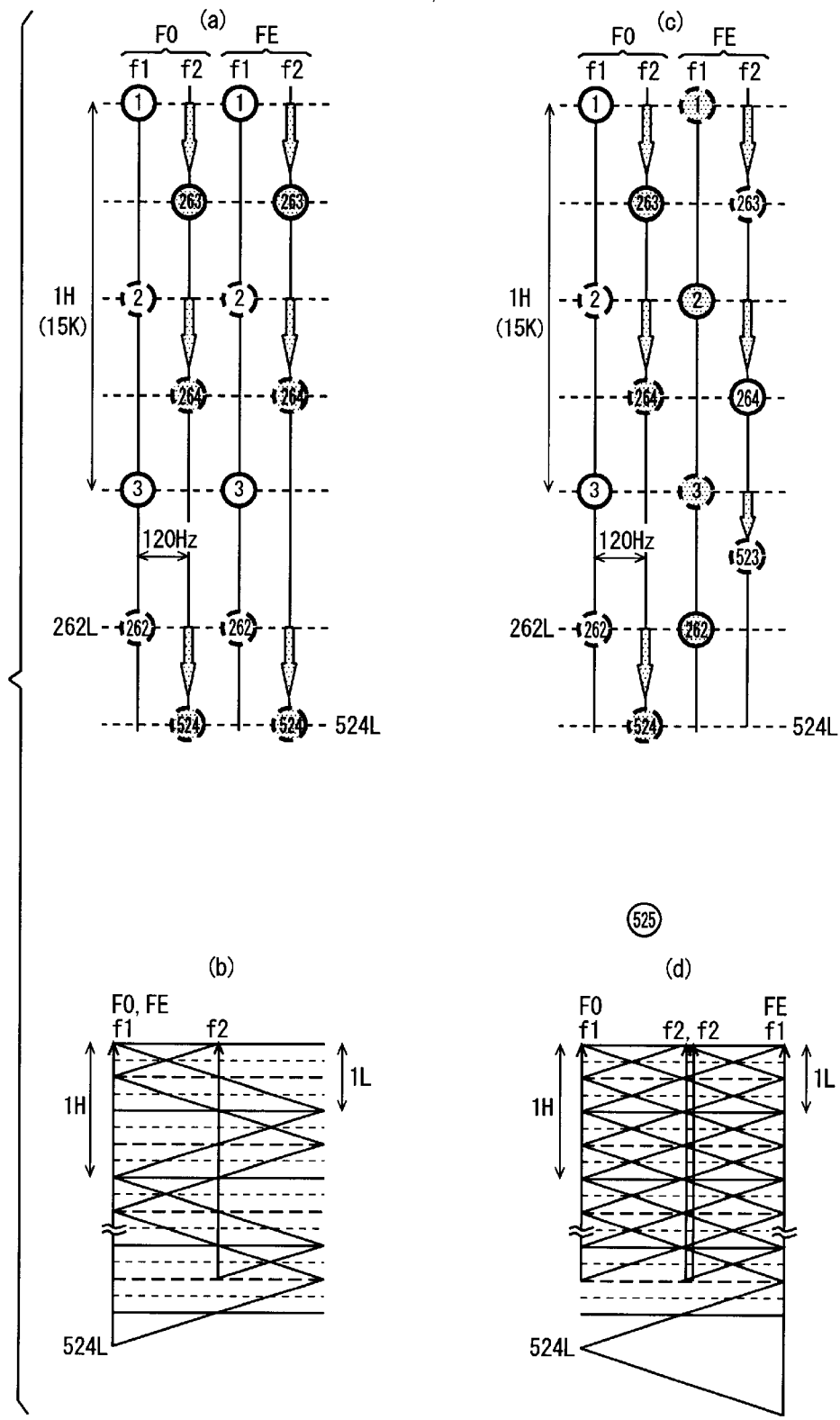
FIGS. 8(a) to 8(d) are conceptual diagrams showing a video display method according to an eighth embodiment of the present invention.
Figure 10:
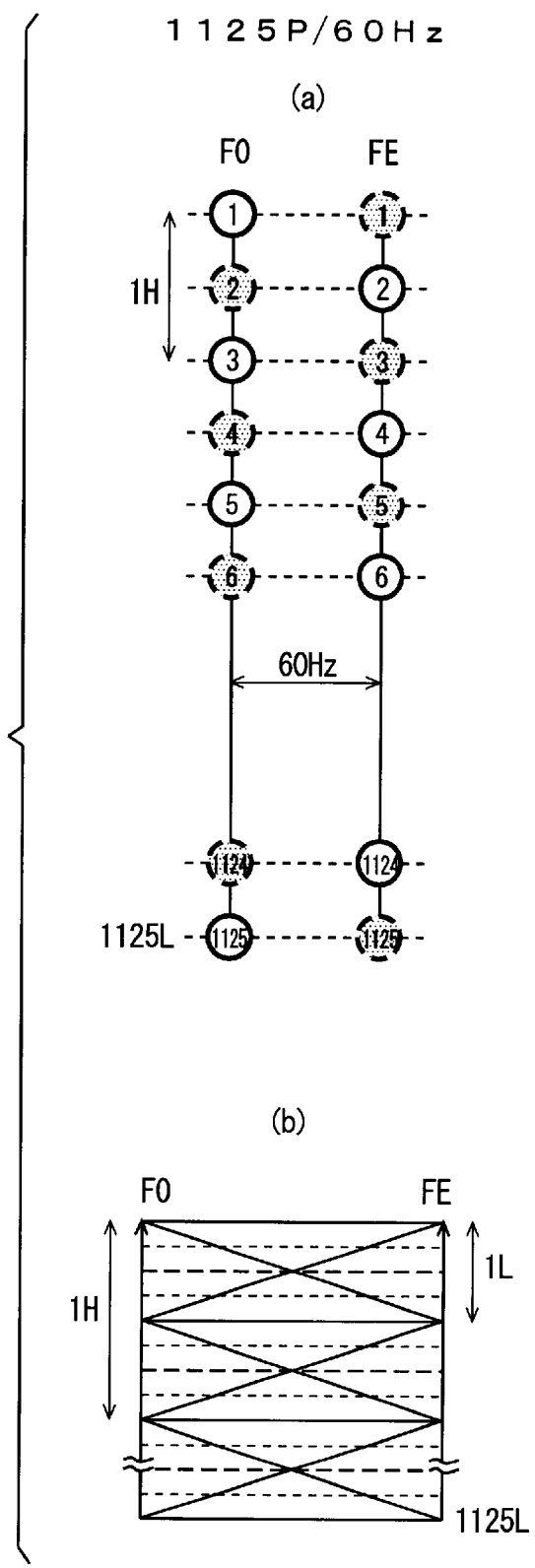
FIGS. 10(a) and 10(b) are conceptual diagrams showing a video display method according to a tenth embodiment of the present invention.
Figure 11:
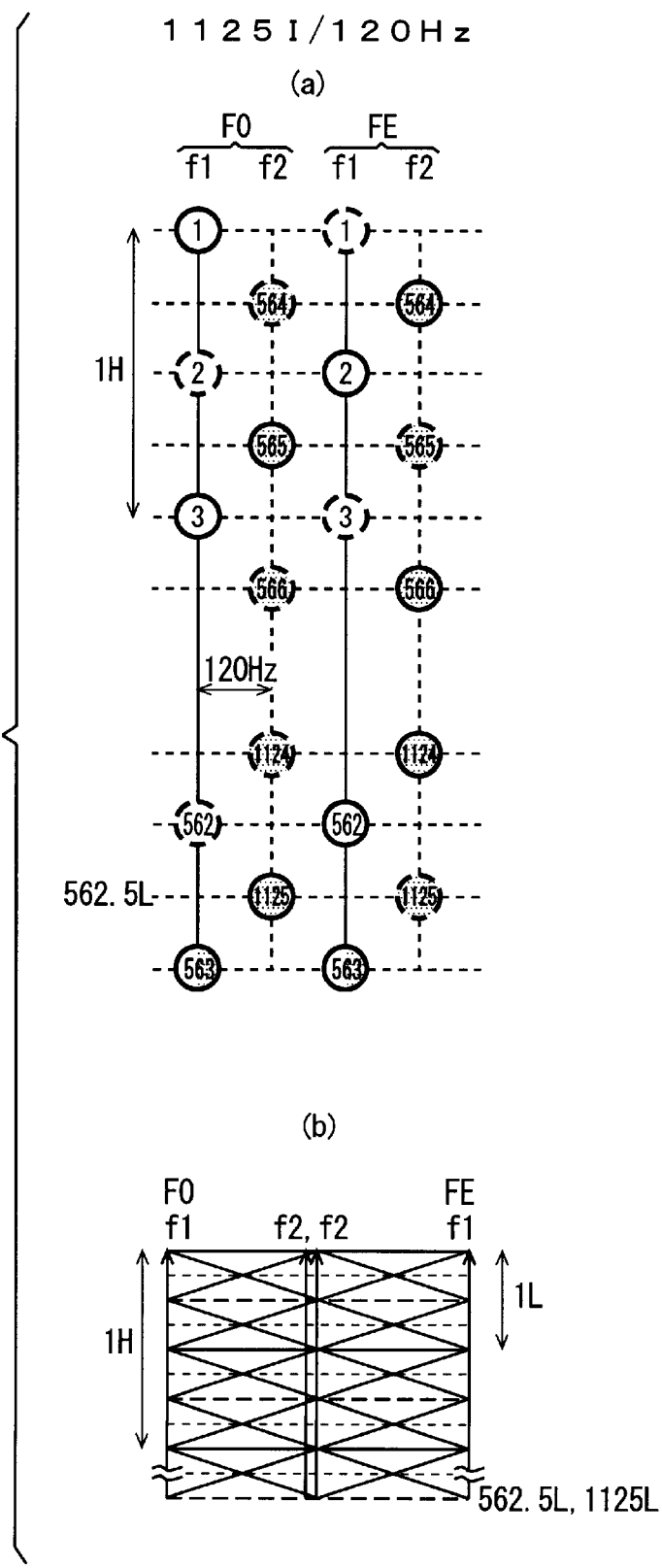
FIGS. 11(a) and 11(b) are conceptual diagrams showing a video display method according to an eleventh embodiment of the present invention.

Embodiments of a video display method according to the present invention are now described with reference to FIGS. 1(a) to 14(d). In the following description, scanning of forward paths in bidirectional scanning is referred to as trace (forward scanning), and scanning of backward paths is referred to as retrace (backward scanning).

Referring to FIGS. 1(a) to 14(b), solid circles show trace scanning lines, and broken circles show retrace scanning lines. Further, halftone circles show scanning lines obtained by interpolation. Symbols FO and FE denote odd and even frames respectively, and symbols f1 and f2 denote first and second fields respectively. Symbol 1L denotes a period of one scanning line, and symbol 1H denotes one horizontal scanning period.

FIGS. 1(a) to 1(d) show a video display method according to a first embodiment of the present invention. FIGS. 1(a) and 1(b) are conceptual diagrams of scanning lines and a scanning structure with a vertical synchronizing signal not subjected to offset processing every frame, and FIGS. 1(c) and 1(d) are conceptual diagrams of the scanning lines and the scanning structure with the vertical synchronizing signal subjected to offset processing every frame.

According to this embodiment, an input video signal of an interlaced scanning system having a vertical scanning frequency of 60 Hz and 525 scanning lines is subjected to interlace/progressive conversion (hereinafter referred to as I/P conversion) and progressive/progressive conversion (hereinafter referred to as P/P conversion), and displayed in a bidirectional progressive scanning system with the vertical scanning frequency of 60 Hz and 1050 scanning lines by reciprocating deflection. In this case, scanning line interpolation is performed on the input video signal by an inter-field operation or an intra-field operation in I/P conversion and P/P conversion, to quadruple the number of the scanning lines.

Further, an input video signal of a progressive scanning system having a vertical scanning frequency of 60 Hz and 525 scanning lines is subjected to P/P conversion so that the number of scanning lines is doubled, and displayed in a bidirectional progressive scanning system with the vertical scanning frequency of 60 Hz and 1050 scanning lines by reciprocating deflection.

Referring to FIGS. 1(a) to 1(d), an input video signal of a progressive scanning system having 525 scanning lines is subjected to P/P conversion.

Each frame has even scanning lines, and hence the scanning directions for the respective scanning lines are identical to each other in the odd and even frames FO and FE if the vertical synchronizing signal is not subjected to offset processing every frame, as shown in FIGS. 1(a) and 1(b).

When the vertical synchronizing signal is subjected to offset processing by a half horizontal scanning period every frame, on the other hand, the scanning directions for the respective scanning lines are reversed in the odd and even frames FO and FE, as shown in FIGS. 1(c) and 1(d).

FIGS. 2(a) to 2(d) show a video display method according to a second embodiment of the present invention. FIGS. 2(a) and 2(b) are conceptual diagrams of scanning lines and a scanning structure with a vertical synchronizing signal not subjected to offset processing every frame, and FIGS. 2(c) and 2(d) are conceptual diagrams of the scanning lines and the scanning structure with the vertical synchronizing signal subjected to offset processing every frame.

According to this embodiment, an input video signal of an interlaced scanning system having a vertical scanning frequency of 60 Hz and 525 scanning lines is subjected to I/P conversion and P/P conversion so that the number of scanning lines is quadruped and the vertical scanning frequency is converted to 120 Hz, and thereafter displayed in a bidirectional interlaced scanning system with the vertical scanning frequency of 120 Hz and 1050 scanning lines by reciprocating deflection.

In this case, the vertical synchronizing signal is subjected to offset processing by a ¼ horizontal scanning period when the second field f2 of each frame is started, whereby interlaced relation can be kept between the first field f1 and the second field f2.

Further, a progressive scanning system having a vertical scanning frequency of 60 Hz and 525 scanning lines is subjected to P/P conversion so that the number of scanning lines is doubled and the vertical scanning frequency is converted to 120 Hz, and thereafter displayed in a bidirectional interlaced scanning system with the vertical scanning frequency of 120 Hz and 1050 scanning lines by reciprocating deflection.

In this case, the vertical synchronizing signal is subjected to offset processing by a ¼ horizontal scanning period when the second field f2 of each frame is started, whereby interlaced relation can be kept between the first field f1 and the second field f2.

Referring to FIGS. 2(a) to 2(d), an input video signal of a progressive scanning system having 525 scanning lines is subjected to P/P conversion.

Each frame has even scanning lines, and hence the scanning directions for the respective scanning lines are identical to each other in the odd and even frames FO and FE if the vertical synchronizing signal is not subjected to offset processing every frame, as shown in FIGS. 2(a) and 2(b).

When the vertical synchronizing signal is subjected to offset processing by a half horizontal scanning period every frame, on the other hand, the scanning directions for the respective scanning lines are reversed in the odd and even frames FO and FE, as shown in FIGS. 2(c) and 2(d).

FIGS. 3(a) and 3(b) show a video display method according to a third embodiment of the present invention. FIG. 3(a) is a conceptual diagram of scanning lines, and FIG. 3(b) is a conceptual diagram of a scanning structure.

According to this embodiment, an input video signal of an interlaced scanning system having a vertical scanning frequency of 60 Hz and 525 scanning lines is subjected to I/P conversion so that the number of scanning lines is doubled, and thereafter displayed in a bidirectional progressive scanning system with the vertical scanning frequency of 60 Hz and 525 scanning lines by reciprocating deflection.

Further, an input video signal of a progressive scanning system having a vertical scanning frequency of 60 Hz and 525 scanning lines is displayed in a bidirectional progressive scanning system with the vertical scanning frequency of 60 Hz and 525 scanning lines by reciprocating deflection.

FIGS. 3(a) and 3(b) show an input video signal of a progressive scanning system having 525 scanning lines.

Each frame has odd scanning lines, and hence the scanning directions for the respective scanning lines are reversed in the odd and even frames FO and FE with no offset processing on a vertical synchronizing signal every frame, as shown in FIGS. 3(a) and 3(b).

FIGS. 4(a) and 4(b) show a video display method according to a fourth embodiment of the present invention. FIG. 4(a) is a conceptual diagram of scanning lines, and FIG. 4(b) is a conceptual diagram of a scanning structure.

According to this embodiment, an input video signal of an interlaced scanning system having a vertical scanning frequency of 60 Hz and 525 scanning lines is subjected to I/P conversion so that the number of scanning lines is doubled and the vertical scanning frequency is converted to 120 Hz, and thereafter displayed in a bidirectional interlaced scanning system with the vertical scanning frequency of 120 Hz and 525 scanning lines by reciprocating deflection.

In an input video signal of a progressive scanning system having a vertical scanning frequency of 60 Hz and 525 scanning lines, further, the vertical scanning frequency is converted to 120 Hz, so that the video signal displayed in a bidirectional interlaced scanning system with the vertical scanning frequency of 120 Hz and 525 scanning lines by reciprocating deflection.

FIGS. 4(a) and 4(b) show an input video signal of a progressive scanning system having 525 scanning lines.

Each frame has odd scanning lines, and hence interlaced relation can be kept between the first field f1 and the second field f2 with no offset processing on a vertical synchronizing signal every second field f2 of each frame, as shown in FIGS. 4(a) and 4(b).

Since each frame has odd scanning lines, further, the scanning directions for the respective scanning lines are reversed in the odd and even frames FO and FE with no offset processing on the vertical synchronizing signal every frame.

FIGS. 5(a) to 5(d) show a video display method according to a fifth embodiment of the present invention. FIGS. 5(a) and 5(b) are conceptual diagrams of scanning lines and a scanning structure with a vertical synchronizing signal not subjected to offset processing every frame, and FIGS. 5(c) and 5(d) are conceptual diagrams of the scanning lines and the scanning structure with the vertical synchronizing signal subjected to offset processing every frame.

According to this embodiment, an input video signal of a progressive scanning system having a vertical scanning frequency of 60 Hz and 262 scanning lines is subjected to P/P conversion so that the number of scanning lines is quadruped, and displayed in a bidirectional progressive scanning system with the vertical scanning frequency of 60 Hz and 1048 scanning lines by reciprocating deflection.

Each frame has even scanning lines, and hence the scanning directions for the respective scanning lines are identical to each other in the odd and even frames FO and FE if the vertical synchronizing signal is not subjected to offset processing every frame, as shown in FIGS. 5(a) and 5(b).

When the vertical synchronizing signal is subjected to offset processing by a half horizontal scanning period every frame, on the other hand, the scanning directions for the respective scanning lines are reversed in the odd and even frames FO and FE, as shown in FIGS. 5(c) and 5(d).

Similar processing can be carried out for performing P/P conversion on an input video signal of a progressive scanning system having a vertical scanning frequency of 60 Hz and 263 scanning lines thereby quadrupling the number of scanning lines and displaying the video signal in a bidirectional progressive scanning system with the vertical scanning frequency of 60 Hz and 1052 scanning lines by reciprocating deflection.

FIGS. 6(a) to 6(d) show a video display method according to a sixth embodiment of the present invention. FIGS. 6(a) and 6(b) are conceptual diagrams of scanning lines and a scanning structure with a vertical synchronizing signal not subjected to offset processing every frame, and FIGS. 6(c) and 6(d) are conceptual diagrams of the scanning lines and the scanning structure with the vertical synchronizing signal subjected to offset processing every frame.

According to this embodiment, an input video signal of a progressive scanning system having a vertical scanning frequency of 60 Hz and 262 scanning lines is subjected to P/P conversion so that the number of scanning lines is quadrupled and the vertical scanning frequency is converted to 120 Hz and thereafter the vertical synchronizing signal is subjected to offset processing by a ¼ horizontal scanning period when the second field f2 of each frame is started, for displaying the video signal in a bidirectional interlaced scanning system with the vertical scanning frequency of 120 Hz and 1048 scanning lines by reciprocating deflection.

Thus, the vertical synchronizing signal is subjected to offset processing by a ¼ horizontal scanning period every second field f2 of each frame, whereby interlaced relation can be kept between the first field f1 and the second field f2.

Each frame has even scanning lines, and hence the scanning directions for the respective scanning lines are identical to each other in the odd and even frames FO and FE if the vertical synchronizing signal is not subjected to offset processing every frame, as shown in FIGS. 6(a) and 6(b).

When the vertical synchronizing signal is subjected to offset processing by a half horizontal scanning period every frame, on the other hand, the scanning directions for the respective scanning lines are reversed in the odd and even frames FO and FE, as shown in FIGS. 6(c) and 6(d).

Similar processing can be carried out for performing P/P conversion on an input video signal of a progressive scanning system having a vertical scanning frequency of 60 Hz and 263 scanning lines for converting the vertical scanning frequency to 120 Hz and thereafter performing offset processing on the vertical synchronizing signal by a ¼ horizontal scanning period when the second field f2 of each frame is started, for displaying the video signal in a bidirectional progressive scanning system with the vertical scanning frequency of 120 Hz and 1052 scanning lines by reciprocating deflection.

FIGS. 7(a) to 7(d) show a video display method according to a seventh embodiment of the present invention. FIGS. 7(a) and 7(b) are conceptual diagrams of scanning lines and a scanning structure with a vertical synchronizing signal not subjected to offset processing every frame, and FIGS. 7(c) and 7(d) are conceptual diagrams of the scanning lines and the scanning structure with the vertical synchronizing signal subjected to offset processing every frame.

According to this embodiment, an input video signal of a progressive scanning system having a vertical scanning frequency of 60 Hz and 262 scanning lines is subjected to P/P conversion so that the number of scanning lines is doubled, and displayed in a bidirectional progressive scanning system with the vertical scanning frequency of 60 Hz and 524 scanning lines by reciprocating deflection.

Each frame has even scanning lines, and hence the scanning directions for the respective scanning lines are identical to each other in the odd and even frames FO and FE if the vertical synchronizing signal is not subjected to offset processing every frame, as shown in FIGS. 7(a) and 7(b).

When the vertical synchronizing signal is subjected to offset processing by a half horizontal scanning period every frame, on the other hand, the scanning directions for the respective scanning lines are reversed in the odd and even frames FO and FE, as shown in FIGS. 7(c) and 7(d).

Similar processing can be carried out for performing P/P conversion on an input video signal of a progressive scanning system having a vertical scanning frequency of 60 Hz and 263 scanning lines thereby doubling the number of scanning lines and displaying the video signal in a bidirectional progressive scanning system with the vertical scanning frequency of 60 Hz and 526 scanning lines by reciprocating deflection.

FIGS. 8(a) to 8(d) show a video display method according to an eighth embodiment of the present invention. FIGS. 8(a) and 8(b) are conceptual diagrams of scanning lines and a scanning structure with a vertical synchronizing signal not subjected to offset processing every frame, and FIGS. 8(c) and 8(d) are conceptual diagrams of the scanning lines and the scanning structure with the vertical synchronizing signal subjected to offset processing every frame.

According to this embodiment, an input video signal of a progressive scanning system having a vertical scanning frequency of 60 Hz and 262 scanning lines is subjected to P/P conversion so that the number of scanning lines is doubled and the vertical scanning frequency is converted to 120 Hz, and thereafter the vertical synchronizing signal is subjected to offset processing by a ¼ horizontal scanning period when the second field f2 of each frame is started, for displaying the video signal in a bidirectional interlaced scanning system with the vertical scanning frequency of 120 Hz and 524 scanning lines by reciprocating deflection.

Thus, the vertical synchronizing signal is subjected to offset processing by a ¼ horizontal scanning period every second field f2 of each frame, whereby interlaced relation can be kept between the first field f1 and the second field f2. In this embodiment, the vertical synchronizing signal is delayed by a ¼ horizontal scanning period every second field f2.

Each frame has even scanning lines, and hence the scanning directions for the respective scanning lines are identical to each other in the odd and even frames FO and FE if the vertical synchronizing signal is not subjected to offset processing every frame, as shown in FIGS. 8(a) and 8(b).

When the vertical synchronizing signal is subjected to offset processing by a half horizontal scanning period every frame, on the other hand, the scanning directions for the respective scanning lines are reversed in the odd and even frames FO and FE, as shown in FIGS. 8(c) and 8(d).

FIGS. 9(a) to 9(d) show a video display method according to a ninth embodiment of the present invention. FIGS. 9(a) and 9(b) are conceptual diagrams of scanning lines and a scanning structure with a vertical synchronizing signal not subjected to offset processing every frame, and FIGS. 9(c) and 9(d) are conceptual diagrams of the scanning lines and the scanning structure with the vertical synchronizing signal subjected to offset processing every frame.

According to this embodiment, an input video signal of a progressive scanning system having a vertical scanning frequency of 60 Hz and 263 scanning lines is subjected to P/P conversion so that the number of scanning lines is doubled and the vertical scanning frequency is converted to 120 Hz and thereafter the vertical synchronizing signal is subjected to offset processing by a ¼ horizontal scanning period when the second field f2 of each frame is started, for displaying the video signal in a bidirectional interlaced scanning system with the vertical scanning frequency of 120 Hz and 526 scanning lines by reciprocating deflection.

Thus, the vertical synchronizing signal is subjected to offset processing by a ¼ horizontal scanning period every second field f2 of each frame, whereby interlaced relation can be kept between the first field f1 and the second field f2. According to this embodiment, the vertical synchronizing signal is set forward by a ¼ horizontal scanning period every second field f2.

Each frame has even scanning lines, and hence the scanning directions for the respective scanning lines are identical to each other in the odd and even frames FO and FE if no offset processing is performed every frame, as shown in FIGS. 9(a) and 9(b).

When the vertical synchronizing signal is subjected to offset processing by a half horizontal scanning period every frame, on the other hand, the scanning directions for the respective scanning lines are reversed in the odd and even frames FO and FE, as shown in FIGS. 9(c) and 9(d).

FIGS. 10(a) and 10(b) show a video display method according to a tenth embodiment of the present invention. FIG. 10(a) is a conceptual diagram of scanning lines, and FIG. 10(b) is a conceptual diagram of a scanning structure.

According to this embodiment, an input video signal of an interlaced scanning system having a vertical scanning frequency of 60 Hz and 1125 scanning lines is subjected to I/P conversion so that the number of scanning lines is doubled, and displayed in a bidirectional progressive scanning system with the vertical scanning frequency of 60 Hz and 1125 scanning lines by reciprocating deflection.

Each frame has odd scanning lines, and hence the scanning directions for the respective scanning lines are reversed in the odd and even frames FO and FE with no offset processing on a vertical synchronizing signal every frame, as shown in FIGS. 10(a) and 10(b).

FIGS. 11(a) and 11(b) show a video display method according to an eleventh embodiment of the present invention. FIG. 11(a) is a conceptual diagram of scanning lines, and FIG. 11(b) is a conceptual diagram of a scanning structure.

According to this embodiment, an input video signal of an interlaced scanning system having a vertical scanning frequency of 60 Hz and 1125 scanning lines is subjected to I/P conversion so that the number of scanning lines is doubled and the vertical scanning frequency is converted to 120 Hz, and thereafter displayed in a bidirectional interlaced scanning system with the vertical scanning frequency of 120 Hz and 1125 scanning lines by reciprocating deflection.

Each frame has odd scanning lines, and hence interlaced relation can be kept between the first field f1 and the second field f2 with no offset processing on a vertical synchronizing signal every second field f2 of each frame, as shown in FIGS. 11(a) and 11(b).

Since each frame has odd scanning lines, further, the scanning directions for the respective scanning lines are reversed in the odd and even frames FO and FE with no offset processing on the vertical synchronizing signal every frame.

FIGS. 12(a) and 12(b) show a video display method according to a twelfth embodiment of the present invention.

FIG. 12(a) is a conceptual diagram of scanning lines, and FIG. 12(b) is a conceptual diagram of a scanning structure.

According to this embodiment, an input video signal of an interlaced scanning system having a vertical scanning frequency of 60 Hz and 1125 scanning lines is displayed in a bidirectional interlaced scanning system with the vertical scanning frequency of 60 Hz and 1125 scanning lines by reciprocating deflection.

Each frame has odd scanning lines, and hence interlaced relation can be kept between the first field f1 and the second field f2 with no offset processing on a vertical synchronizing signal every second field f2 of each frame, as shown in FIGS. 12(a) and 12(b).

Since each frame has odd scanning lines, further, the scanning directions for the respective scanning lines are reversed in the odd and even frames FO and FE with no offset processing on the vertical synchronizing signal every frame.

Figure 13:
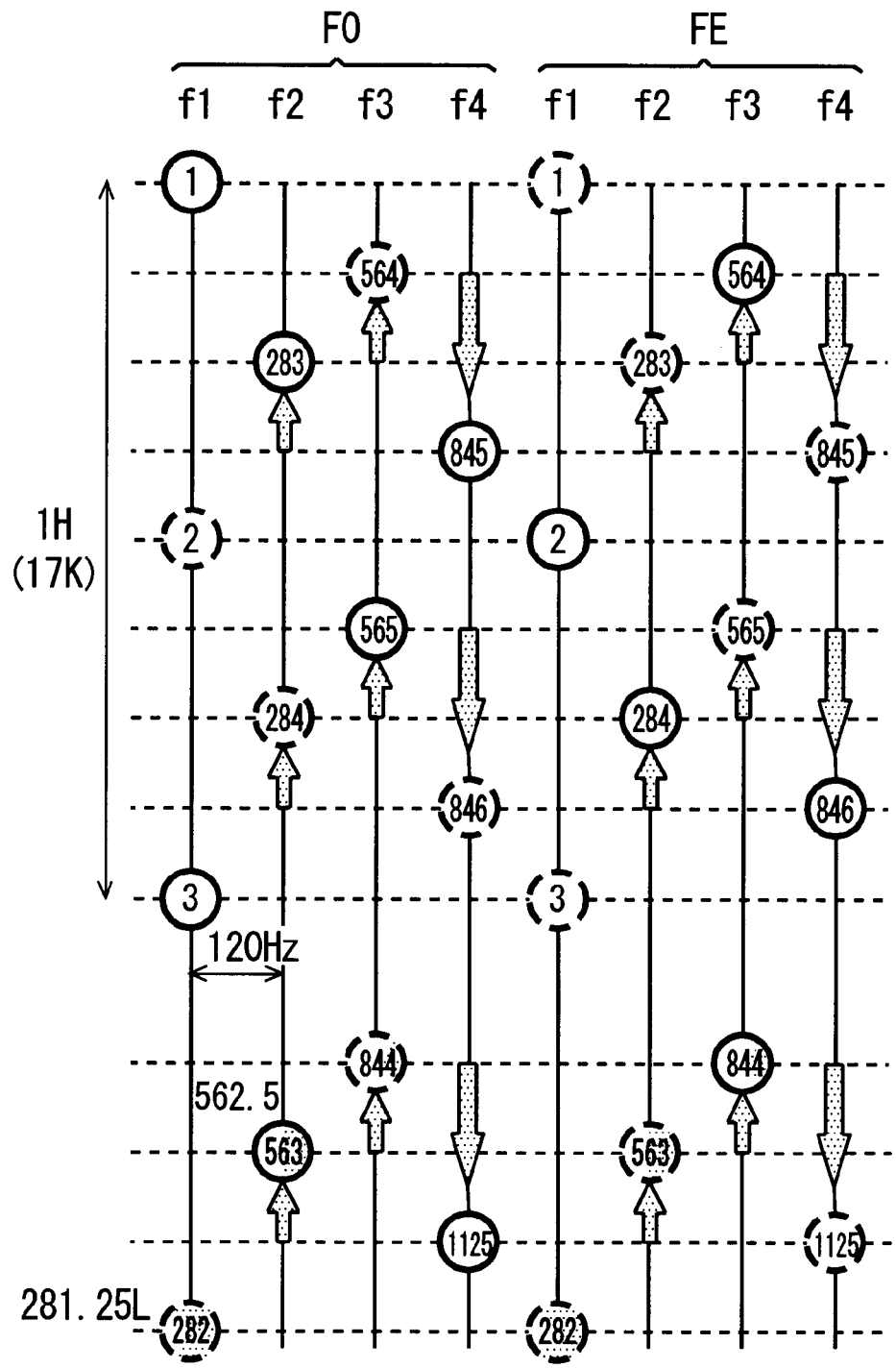
FIG. 13 is a conceptual diagram showing a video display method according to a thirteenth embodiment of the present invention.
Figure 14:
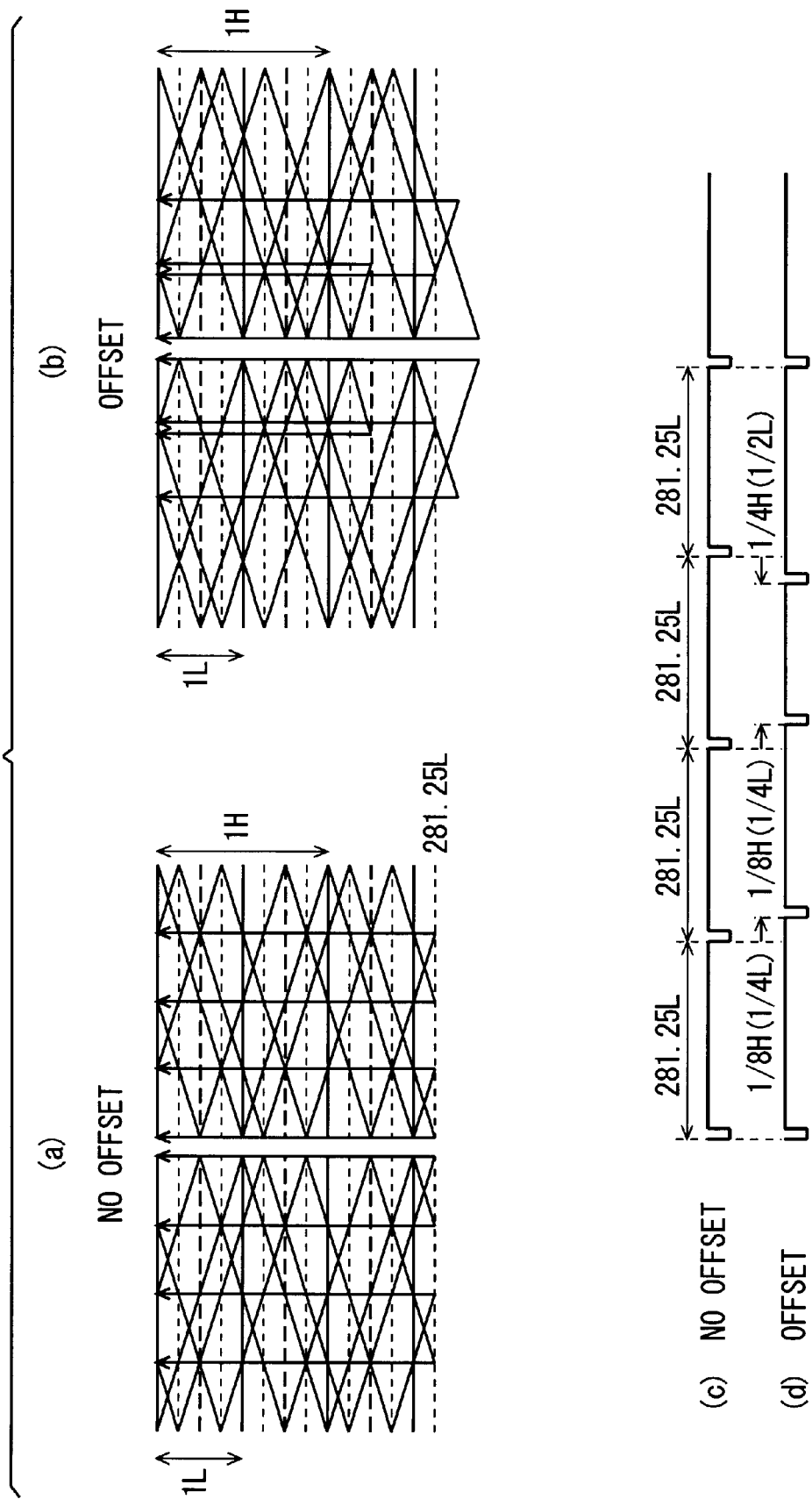
FIGS. 14(a) and 14(b) are conceptual diagrams of a scanning structure not performing and performing offset processing on a vertical synchronizing signal every prescribed field in the video display method shown in FIG. 13 respectively.
FIGS. 14(c) and 14(d) are timing charts of the vertical synchronizing signal.

FIG. 13 is a conceptual diagram of scanning lines in a video display method according to a thirteenth embodiment of the present invention.

FIG. 14(a) is a conceptual diagram showing a scanning structure in the case of performing no offset processing on prescribed fields in the video display method shown in FIG. 13, and FIG. 14(b) is a conceptual diagram showing the scanning structure in the case of performing offset processing on prescribed fields in the video display method shown in FIG. 13. FIG. 14(c) is a timing chart of a vertical synchronizing signal in the case of performing no offset processing on prescribed fields in the video display method shown in FIG. 13, and FIG. 14(d) is a timing chart of the vertical synchronizing signal in the case of performing offset processing on prescribed fields in the video display method shown in FIG. 13.

In an input video signal of an interlaced scanning system having a vertical scanning frequency of 60 Hz and 1125 scanning lines, the vertical scanning frequency is converted to 120 Hz and thereafter the video signal displayed in a bidirectional interlaced scanning system of a four-field sequence with the vertical scanning frequency of 120 Hz and 1125 scanning lines according to this embodiment.

When no offset processing is performed on a vertical synchronizing signal in second, third and fourth fields f2, f3 and f4 of each frame, each scanning line of each field is not formed on an intermediate portion between scanning lines of a previous field, as shown in FIGS. 14(a) and 14(c). Thus, the picture quality is disturbed.

When the vertical synchronizing signal is subjected to offset processing by a ⅛ horizontal scanning period, a ⅛ horizontal scanning period and a ¼ horizontal scanning period when the second, third and fourth fields f2, f3 and f4 are started respectively as shown in FIGS. 14(b) and 14(d), interlaced relation can be kept between the first field f1 and the second field f2, between the second field f2 and the third field f3, between the third field f3 and the fourth field f4 and between the fourth field f4 and the first field f1.

Since each frame has odd scanning lines, further, the scanning directions for the respective scanning lines are reversed in the odd and even frames FO and FE with no offset processing on the vertical synchronizing signal every frame.

Table 1 shows conversion methods for various types of video signals.

TABLE 1

| | | Output | | | Processing | | |
|---|---|---|---|---|---|---|---|
| Input System | Vertical Conversion Magnification | Number of Scanning Lines | System | Frequency [Hz] | Reciprocating Frame Inversion | Interlace Keeping | Examplary Conversion |
| I | 4 | even | P | 60 | 1/2H | — | 525I→1050P |
| | | | I | 120 | 1/2H | 1/4H | 525I→1050I |
| P | 4 | even | P | 60 | 1/2H | — | 262P→1048P |
| | | | | | | | 263P→1052P |
| | | | I | 120 | 1/2H | 1/4H | 262P→1048I |
| | | | | | | | 263P→1052I |
| I | 2 | odd | P | 60 | automatic | — | 525I→525P |
| | | | | | | | 1125I→1125P |
| | | | I | 120 | automatic | automatic | 525I→525I |
| | | | | | | | 1125I→1125I |
| P | 2 | even | P | 60 | 1/2H | — | 262P→524P |
| | | | | | | | 263P→526P |
| | | | | | | | 525P→1050P |
| | | | I | 120 | 1/2H | 1/4H | 262P→524I |
| | | | | | | | 263P→526I |
| | | | | | | | 525P→1050I |
| I | 1 | odd | I | 60 | automatic | — | 525I→525I |
| | | | | | | | 1125I→1125I |
| | | | I | 120 | automatic | 1/8H, 1/4H | 1125I→1125II |
| P | 1 | even | P | 60 | 1/2H | — | 262P→262P |
| | | | | | | | 750P→750P |
| | | | I | 120 | 1/2H | 1/4H | 262P→262I |
| | | | | | | | 750P→750I |
| | | odd | P | 60 | automatic | 1/4H | 263P→263P |
| | | | | | | | 525P→525P |
| | | | I | 120 | automatic | automatic | 263P→263I |
| | | | | | | | 525P→525I |

Referring to Table 1, "I" stands for an interlaced scanning system and "P" stands for a progressive scanning system in "Input System" and "Output System". "Vertical Conversion Magnification" indicates the magnification for increasing the number of scanning lines in each frame in I/P conversion and P/P conversion. "Even" and "odd" in "Number of Scanning Lines" indicate that the numbers of scanning lines in single frames are even and odd respectively. "Output Frequency" indicates the vertical scanning frequency.

"Reciprocating Frame Reversion" in "Processing" indicates an offset quantity of the vertical synchronizing signal for reversing the scanning direction for each scanning line in the odd and even frames FO and FE, "½H" indicates that the vertical synchronizing signal is subjected to offset processing by a half horizontal scanning period, and "automatic" indicates that the scanning direction is automatically reversed with no offset processing on the vertical synchronizing signal. "Interlace Keeping" in "Processing" indicates the offset quantity of the vertical synchronizing signal for a prescribed field for keeping interlaced relation between the respective fields of each frame. "¼H" indicates that the vertical synchronizing signal is subjected to offset processing by a ¼ horizontal scanning period, and "automatic" indicates that interlaced relation is automatically kept with no offset processing on the vertical synchronizing signal.

"I" and "P" in "Exemplary Conversion" stand for a video signal of an interlaced scanning system and a video signal of a progressive scanning system respectively. For example, "525I→1050P" indicates that a video signal of an interlaced scanning system having 525 scanning lines is displayed in a bidirectional progressive scanning system with 1050 scanning lines. "1125I→1125II" indicates that a video signal of an interlaced scanning system having 1125 scanning lines is displayed in a bidirectional interlaced scanning system of a four-field sequence with 1125 scanning lines (see FIGS. 13 and 14(a) to 14(d)).

When each frame has even scanning lines, the vertical synchronizing signal is subjected to offset processing by a half horizontal scanning period every frame, so that the scanning directions for the respective scanning lines are reversed in the odd and even frames FO and FE, as shown in Table 1. When each frame has odd scanning lines, on the other hand, the scanning directions for the respective scanning lines are automatically reversed in the odd and even frames FO and FO with no offset processing on the vertical synchronizing signal every frame.

When the scanning directions for the respective scanning lines are alternately reversed in the odd and even frames FO and FE, an error between a forward time and a backward scanning or between brightness of forward scanning lines and that of backward scanning lines is averaged on the time base, to cause no deterioration of the picture quality. Thus, design accuracy for a deflection system is relaxed.

When each frame has even scanning lines, the vertical scanning frequency is converted from 60 Hz to 120 Hz and the vertical synchronizing signal is subjected to offset processing by a ¼ horizontal scanning period when the second field f2 of each frame is started, so that interlaced relation can be kept between the first field f1 and the second field f2. When each frame has odd scanning lines, on the other hand, the vertical scanning frequency is converted from 60 Hz to 120 Hz so that interlaced relation can be automatically kept between the first field f1 and the second field f2 with no offset processing on the vertical synchronizing signal every second field f2 of each frame.

Thus, the picture quality can be improved by keeping interlaced relation between the first field f1 and the second field f2 of each frame.

FIG. 15 is a block diagram showing the structure of a video display apparatus carrying out the video display methods according to the first to thirteenth embodiments of the present invention.

In the video display apparatus shown in FIG. 15, a composite video signal VD is supplied to a Y/C separation circuit (luminance signal/chrominance signal separation circuit) 1 and an input terminal a of a selector 21. The Y/C separation circuit 1 separates a luminance signal and a chrominance signal from the video signal VD, and supplies a video signal VDI consisting of the luminance signal and chrominance-difference signals to another input terminal b of the selector 21.

A synchronizing signal separation circuit 2 separates a horizontal synchronizing signal HI and a vertical synchronizing signal VI from the video signal VD, and supplies the horizontal synchronizing signal HI and the vertical synchronizing signal VI to a control signal generation circuit 10. A signal determination circuit 11 determines the type of the input video signal VD, and supplies the result of determination to the control signal generation circuit 10.

The control signal generation circuit 10 generates horizontal synchronizing signals H1 to H4 and vertical synchronizing signals V1 to V4 in response to the horizontal synchronizing signal H1 and the vertical synchronizing signal VI and, outputs switching signals SW1 to SW4 and conversion magnification specifying signals G1 and G2 while switching the frequency of a clock signal CLK on the basis of the result of determination by the signal determination circuit 11.

The frequencies of the horizontal synchronizing signal H1, the horizontal synchronizing signal H2 and the horizontal synchronizing signals H3 and H4 are 15.7 KHz, 31.5 KHz and 62.9 KHz respectively. The frequencies of the vertical synchronizing signals V1, V2 and V3 and the vertical synchronizing signal V4 are 59.94 Hz and 119.88 Hz respectively.

The selector 21 selectively outputs the video signal VD supplied to the input terminal a or the video signal VDI supplied to the other input terminal b on the basis of the switching signal SW1. The output signal of the selector 21 is input in an interlace/progressive conversion part (hereinafter referred to as an I/O conversion part) 3 and an input terminal a of a selector 22.

The I/P conversion part 3 converts the video signal VDI of an interlaced scanning system to a video signal of a progressive scanning system in response to the horizontal synchronizing signal HI, the vertical synchronizing signal VI and the clock signal CLK, and inputs this video signal in another input terminal b of the selector 22. In this case, the I/P conversion part 3 increases the number of scanning lines by an inter-field operation or an intra-field operation in a magnification specified by the conversion magnification specifying signal G1. The I/P conversion part 3 employs an inter-field operation for a still picture, while employing an intra-field operation for a motion picture.

The selector 22 selectively outputs the video signal supplied to the input terminal a or that supplied to the other input terminal b on the basis of the switching signal SW2. The output signal of the selector 22 is input as a video signal VD1 in a progressive/progressive conversion part (hereinafter referred to as a P/P conversion part) 4 and an input terminal a of a selector 23.

The P/P conversion part 4 converts the video signal VD1 of a progressive scanning system to a video signal of a progressive scanning system in response to the horizontal synchronizing signal H2, the vertical synchronizing signal V2 and the clock signal CLK, and inputs this video signal in another input terminal b of the selector 23. In this case, the P/P conversion part 4 increase the number of scanning lines by an intra-field operation in a magnification specified by the conversion magnification specifying signal G2.

The selector 23 selectively outputs the video signal supplied to the input terminal a or that supplied to the other input terminal b on the basis of the switching signal SW3. The output signal of the selector 23 is input as a video signal VD2 in a 120 Hz conversion part 5 and an input terminal a of a selector 24.

The 120 Hz conversion part 5 converts the video signal VD2 of a progressive scanning system having a vertical scanning frequency of 60 Hz to a video signal of a progressive scanning system having a vertical scanning frequency of 120 Hz in response to the horizontal synchronizing signal H3, the vertical synchronizing signal V3 and the clock signal CLK, and inputs this video signal in another input terminal b of the selector 24.

The selector 24 selectively outputs the video signal supplied to the input terminal a or that supplied to the other input terminal b on the basis of the switching signal SW4. The output signal of the selector 24 is input as a video signal VD3 in a reciprocation processing part 6.

The reciprocation processing part 6 alternately reverses the time base of the video signal VD3 every scanning line in response to the horizontal synchronizing signal H4, the vertical synchronizing signal V4 and the clock signal CLK, and outputs the processed signal as a video signal VD4. The reciprocation processing part 6 outputs a horizontal synchronizing signal HO and a vertical synchronizing signal VO on the basis of the horizontal synchronizing signal H4 and the vertical synchronizing signal V4. The structure of the reciprocation processing part 6 is described later.

A dematrix circuit 7 converts the video signal VD4 output from the reciprocation processing part 6 to a primary color signal VDO consisting of an R signal, a G signal and a B signal and supplies this signal to a CRT (cathode ray tube) 9.

A deflection circuit 8 supplies a horizontal deflection signal LH and a vertical deflection signal LV for bidirectional scanning to a deflection coil (not shown) of the CRT 9 in synchronization with the horizontal synchronizing signal HO and the vertical synchronizing signal VO output from the reciprocation processing part 6.

According to this embodiment, the I/P conversion part 3, the P/P conversion part 4 and the 120 Hz conversion part 5 correspond to the conversion circuit, the reciprocation processing part 6 corresponds to the scanning line reversion circuit, and the dematrix circuit 7, the deflection circuit 8 and the CRT 9 form the display part.

Exemplary operations of the video display apparatus shown in FIG. 15 are now described. A video signal of an interlaced scanning system having 525 scanning lines and a vertical scanning frequency of 60 Hz is displayed in a bidirectional interlaced scanning system with 1050 scanning lines and a vertical scanning frequency of 120 Hz.

In this case, the selectors 21, 22, 23 and 24 are switched toward the input terminals b. The Y/C separation circuit 1 outputs the video signal VDI of an interlaced scanning system having 525 scanning lines and a vertical scanning frequency of 60 Hz.

The I/P conversion part 3 converts the video signal VDI to the video signal VD1 of a progressive scanning system having 525 scanning lines and the vertical scanning frequency of 60 Hz. Then, the P/P conversion part 4 converts the video signal VD1 to the video signal VD2 of a progressive scanning system having 1050 scanning lines and the vertical scanning frequency of 60 Hz.

Thereafter the 120 Hz conversion part 5 converts the video signal VD2 to the video signal VD3 having 1050 scanning lines 1050 and a vertical scanning frequency of 120 Hz. The reciprocation processing part 6 alternately reverses the time base of the video signal VD3 every scanning line, and outputs the video signal VD4 of a bidirectional scanning system having 1050 scanning lines and the vertical scanning frequency of 120 Hz.

The dematrix circuit 7 outputs the primary color signal VDO to the CRT 9 on the basis of the video signal VD4, while the deflection circuit 8 supplies the horizontal deflection signal LH and the vertical deflection signal LV to the deflection coil of the CRT 9 in synchronization with the horizontal synchronizing signal HO and the vertical synchronizing signal VO. Thus, the CRT 9 displays an image by bidirectional scanning with 1050 scanning lines and the vertical scanning frequency of 120 Hz.

The video display apparatus shown in FIG. 15 is not restricted to the above but can display any of various video signals in a bidirectional interlaced scanning system or a bidirectional progressive scanning system with a desired number of scanning lines and a desired vertical scanning frequency.

In order to display a video signal of an interlaced scanning system having 525 scanning lines and a vertical scanning frequency of 60 Hz in a bidirectional progressive scanning system with 1050 scanning lines and the vertical scanning frequency of 60 Hz, for example, the selector 24 is switched toward the input terminal a. In order to display a video signal of a progressive scanning system having 525 scanning lines and a vertical scanning frequency of 60 Hz in a bidirectional interlaced scanning system with 1050 scanning lines and a vertical scanning frequency of 120 Hz, the selectors 21 and 22 are switched toward the input terminals a.

Thus, various video signals can be displayed in various bidirectional scanning systems by switching the selectors 21, 22, 23 and 24 toward the input terminals a or b, switching the vertical conversion magnifications of the I/P conversion part 3 and the P/P conversion part 4 through the conversion magnification specifying signals G1 and G2 and switching the frequency of the clock signal CLK.

Figure 16:
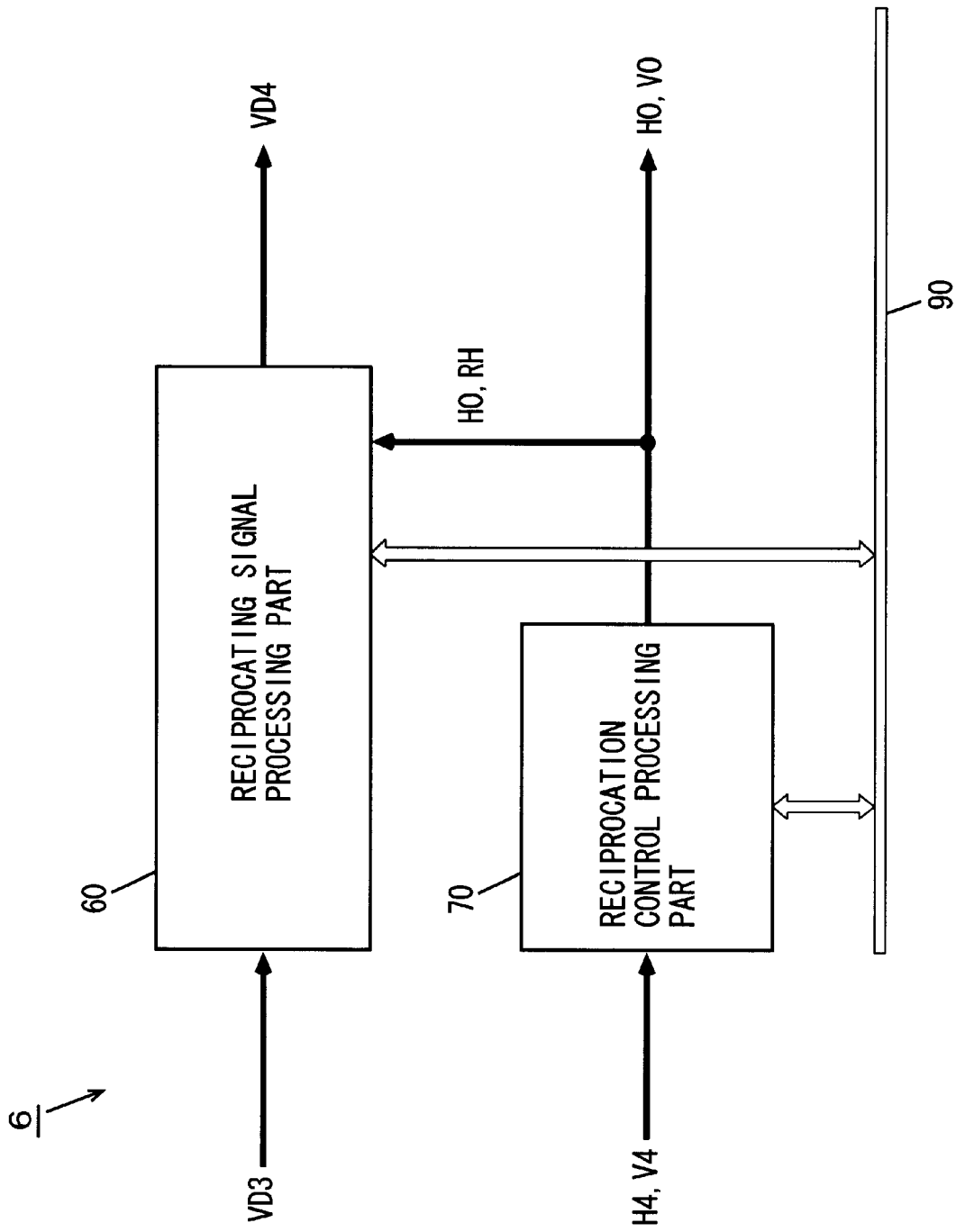
FIG. 16 is a block diagram showing the structure of a reciprocation processing part of FIG. 15.

FIG. 16 is a block diagram showing the structure of the reciprocation processing part 6 shown in FIG. 15.

The reciprocation processing part 6 includes a reciprocating signal processing part 60 and a reciprocation control processing part 70. The reciprocating signal processing part 60 and the reciprocation control processing part 70 are connected to a CPU bus 90.

The reciprocation control processing part 70 outputs the horizontal synchronizing signal HO, the vertical synchronizing signal VO and a reciprocation control signal RH on the basis of the horizontal synchronizing signal H4 and the vertical synchronizing signal V4. The reciprocating signal processing part 60 alternately reverses the time base of the video signal VD3 every scanning line in response to the horizontal synchronizing signal HO and the reciprocation control signal RH output from the reciprocation control processing part 70, and outputs the video signal VD4 of a bidirectional scanning system.

Figure 17:
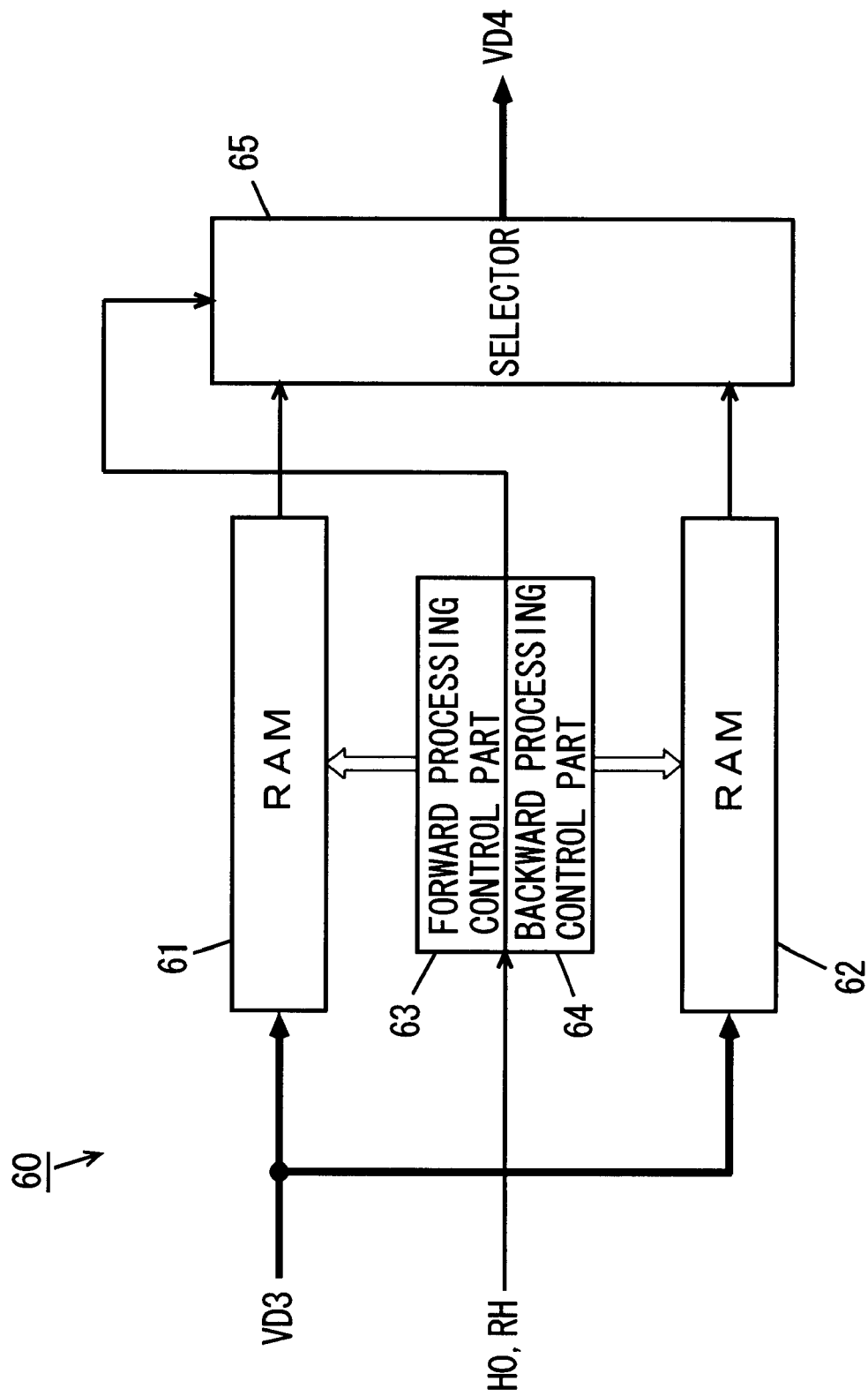
FIG. 17 is a block diagram showing the structure of a reciprocating signal processing part of FIG. 16.

FIG. 17 is a block diagram showing the structure of the reciprocating signal processing part 60 shown in FIG. 16.

Figure 18:
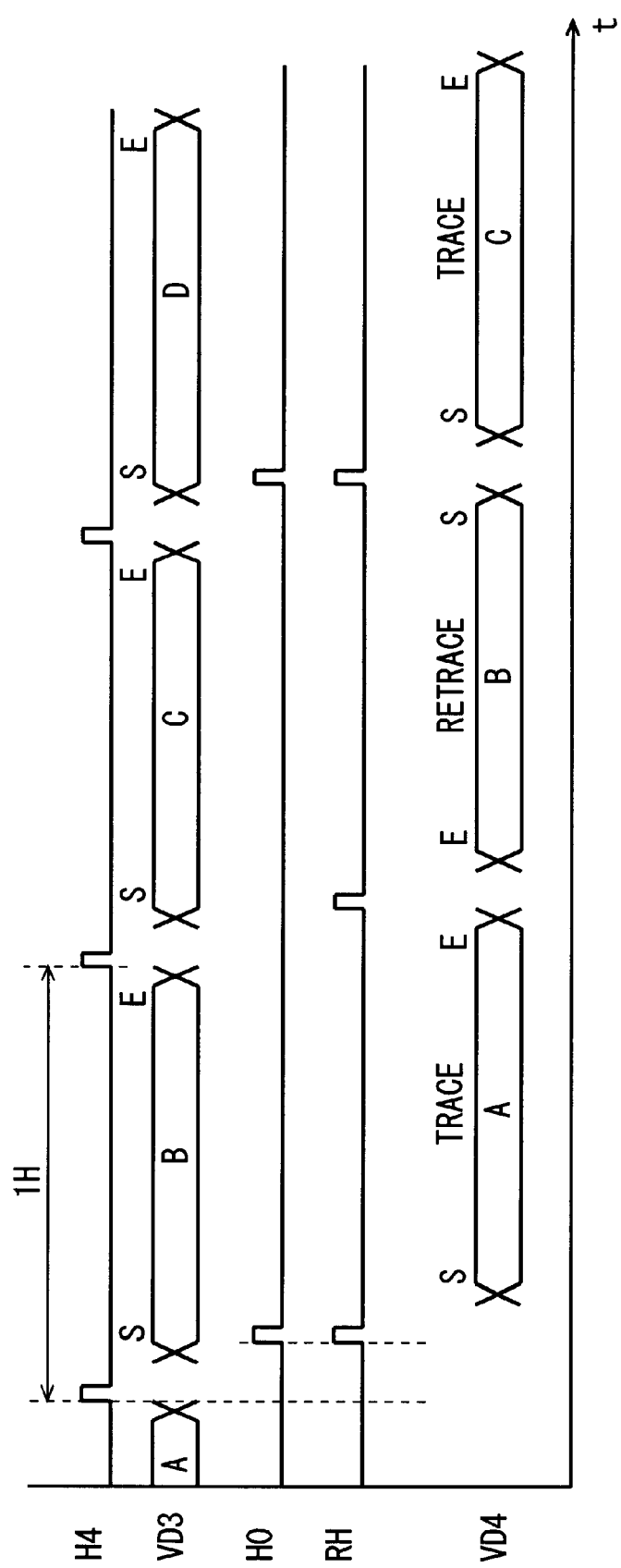
FIG. 18 is a timing chart for illustrating operations of the reciprocating signal processing part of FIG. 17.

FIG. 18 is a timing chart for illustrating operations of the reciprocating signal processing part 60 shown in FIG. 17.

As shown in FIG. 17, the reciprocating signal processing part 60 includes RAMs (random access memories) 61 and 62, a forward processing control part 63, a backward processing control part 64 and a selector 65. The RAMs 61 and 62 are supplied with the video signal VD3.

As shown in FIG. 18, the cycle of the horizontal synchronizing signal H4 corresponds to one horizontal scanning period (1H). The horizontal synchronizing signal HO has a cycle twice that of the horizontal synchronizing signal H4, and lags the horizontal synchronizing signal H4 by a constant time. The reciprocation control signal RH has a cycle half that of the horizontal synchronizing signal HO.

The forward processing control part 63 and the backward processing control part 64 sequentially write the video signal VD3 in the RAMs 61 and 62 respectively in response to the horizontal synchronizing signal HO and the reciprocation control signal RH. Referring to FIG. 18, symbol S denotes data initially written in the RAMs 61 and 62, and symbol E denotes data finally written in the RAMs 61 and 62.

The forward processing control part 63 reads the video signal VD3 stored in the RAM 61 in the same order as the write order in response to the reciprocation control signal RH. On the other hand, the backward processing control part 64 reads the video signal VD3 stored in the RAM 62 in the reverse of the write order in response to the reciprocation control signal RH.

The selector 65 selectively outputs the video signal VD3 read from the RAM 61 as the video signal VD4 on the basis of the horizontal synchronizing signal HO and the reciprocation control signal RH in a trace period. Further, the selector 65 selectively outputs the video signal VD3 read from the RAM 62 as the video signal VD4 in a retrace period.

Thus, the video signal VD3 of a progressive scanning system is converted to the video signal VD4 of a bidirectional scanning system.

Figure 19:
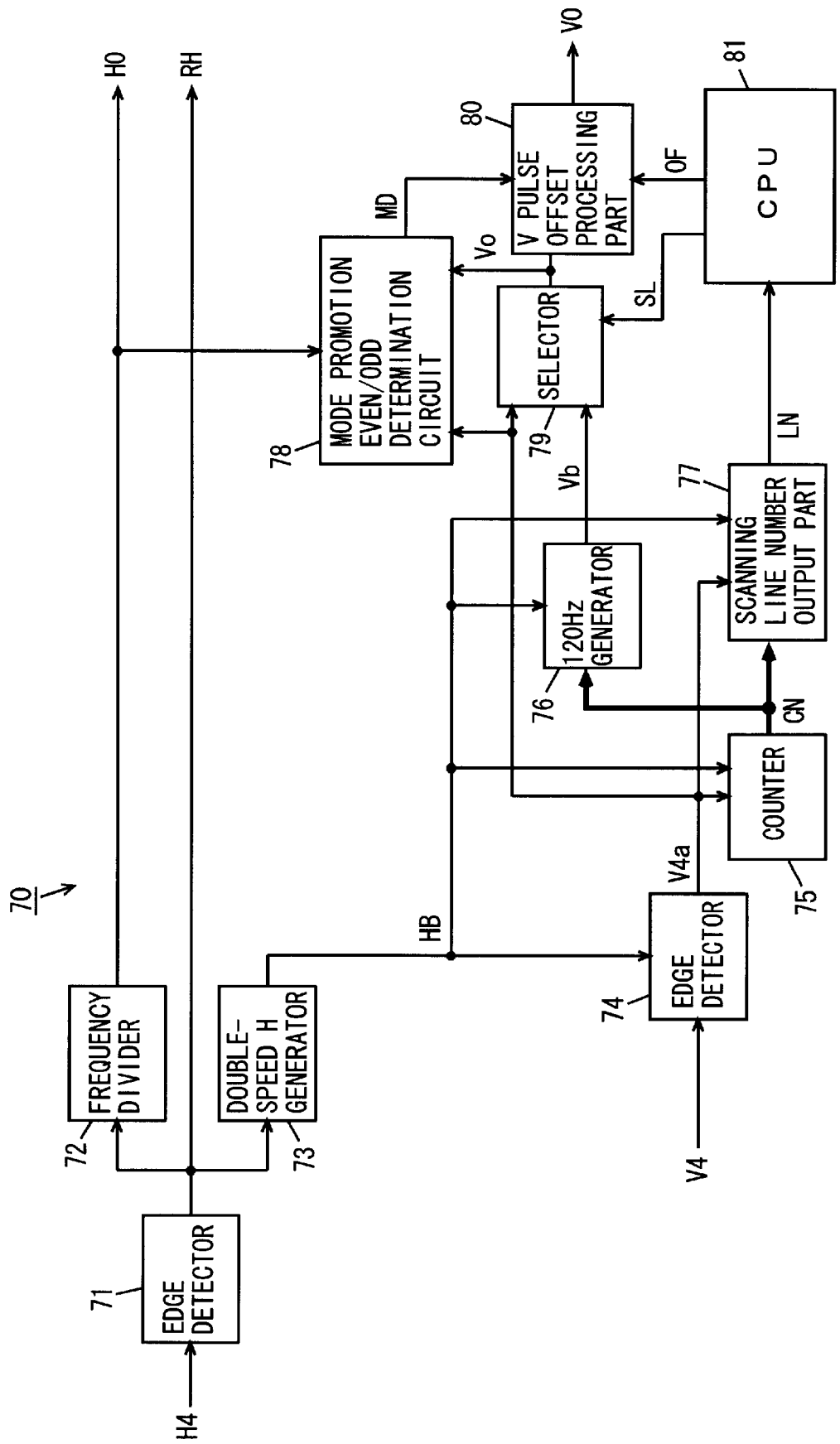
FIG. 19 is a block diagram showing the structure of a reciprocation control processing part of FIG. 16.

FIG. 19 is a block diagram showing the structure of the reciprocation control processing part 70 shown in FIG. 16.

The reciprocation control processing part 70 shown in FIG. 19 includes an edge detector 71, a frequency divider 72, a double-speed horizontal synchronizing signal generator (double-speed H generator) 73, an edge detector 74, a counter 75, a 120 Hz generator 76, a scanning line number output part 77, a mode promotion even/odd determination circuit 78, a selector 79, a V pulse offset processing part 80 and a CPU 81.

The edge detector 71 detects the leading edge of the horizontal synchronizing signal H4, and outputs the reciprocation control signal RH having a constant pulse width. As shown in FIG. 18, the reciprocation control signal RH has the same cycle as the horizontal synchronizing signal H4 and lags the horizontal synchronizing signal H4.

The frequency divider 72 frequency-divides the reciprocation control signal RH into two and outputs the horizontal synchronizing signal HO. As shown in FIG. 18, the horizontal synchronizing signal HO has a cycle twice that of the horizontal synchronizing signal H4 and lags the horizontal synchronizing signal H4.

The double-speed H generator 73 generates a double-speed horizontal synchronizing signal HB having a frequency twice that of the reciprocation control signal RH. The double-speed horizontal synchronizing signal HB has a cycle half that of the horizontal synchronizing signal H4.

The double-speed horizontal synchronizing signal HB is supplied to the edge detector 74, the counter 75, the 120 Hz generator 76 and the scanning line number output part 77.

The edge detector 74 detects the leading edge of the vertical synchronizing signal V4 in response to the double-speed horizontal synchronizing signal HB, and outputs a vertical synchronizing signal V4 a having a constant pulse width. The vertical synchronizing signal V4 a has the same cycle as the vertical synchronizing signal V4 and lags the vertical synchronizing signal V4.

The vertical synchronizing signal V4 a is supplied to the 120 Hz generator 76, the scanning line number output part 77, the mode promotion even/odd determination circuit 78 and an input terminal of the selector 79, and supplied to the counter 75 as a reset signal.

The counter 75 is reset in response to the vertical synchronizing signal V4a to count the double-speed horizontal synchronizing signal HB, and supplies a count value CN to the 120 Hz generator 76 and the scanning line number output part 77. The count value CN of the counter 75 is twice the number of scanning lines in one field.

The scanning line number output part 77 supplies a scanning line number signal LN indicating the number of scanning lines in one field to the CPU 81 on the basis of the count value CN of the counter 75. The CPU 81 determines the type of the input video signal on the basis of the scanning line number signal LN, and supplies an offset quantity OF responsive to the type of the input video signal to the V pulse offset processing part 80.

The 120 Hz generator 76 supplies a vertical synchronizing signal Vb corresponding to the vertical scanning frequency of 120 Hz to another input terminal of the selector 79 in response to the count value CN of the counter 75 and the double-speed horizontal synchronizing signal HB. The vertical synchronizing signal V4 a supplied to the input terminal of the selector 79 has the frequency of 60 Hz, and the vertical synchronizing signal Vb supplied to the other input terminal of the selector 79 has the frequency of 120 Hz.

The CPU 81 supplies a switching signal SL to the selector 79 on the basis of a previously set vertical scanning frequency. The selector 79 outputs either the vertical synchronizing signal V4a or the vertical synchronizing signal Vb to the mode promotion even/odd determination circuit 78 and the V pulse offset processing part 80 as a vertical synchronizing signal Vo in response to the switching signal SL. The selector 79 outputs the vertical synchronizing signal V4a when the vertical scanning frequency is set to 60 Hz, while the selector 79 outputs the vertical synchronizing signal Vb when the vertical scanning frequency is set to 120 Hz.

The mode promotion even/odd determination circuit 78 outputs a mode signal MD indicating the current field on the basis of the vertical synchronizing signal V4a and the vertical synchronizing signal Vo. The V pulse offset processing part 80 performs prescribed offset processing responsive to the input video signal on the vertical synchronizing signal V4a or the vertical synchronizing signal Vb on the basis of the mode signal MD, the vertical synchronizing signal Vo and the offset quantity OF supplied from the CPU 81, and outputs the processed signal as the vertical synchronizing signal VO.

Figure 20:
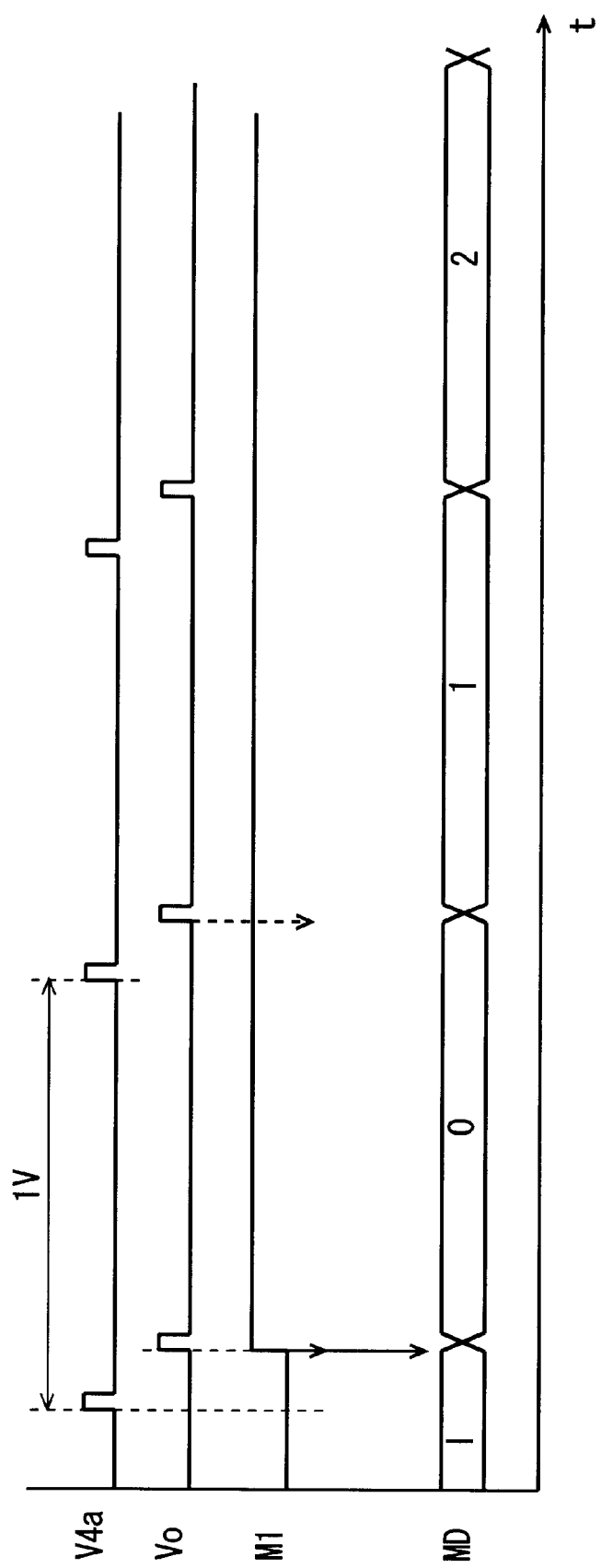
FIG. 20 is a timing chart for illustrating operations of a mode promotion even/odd determination circuit shown in FIG. 19.
Figure 21:
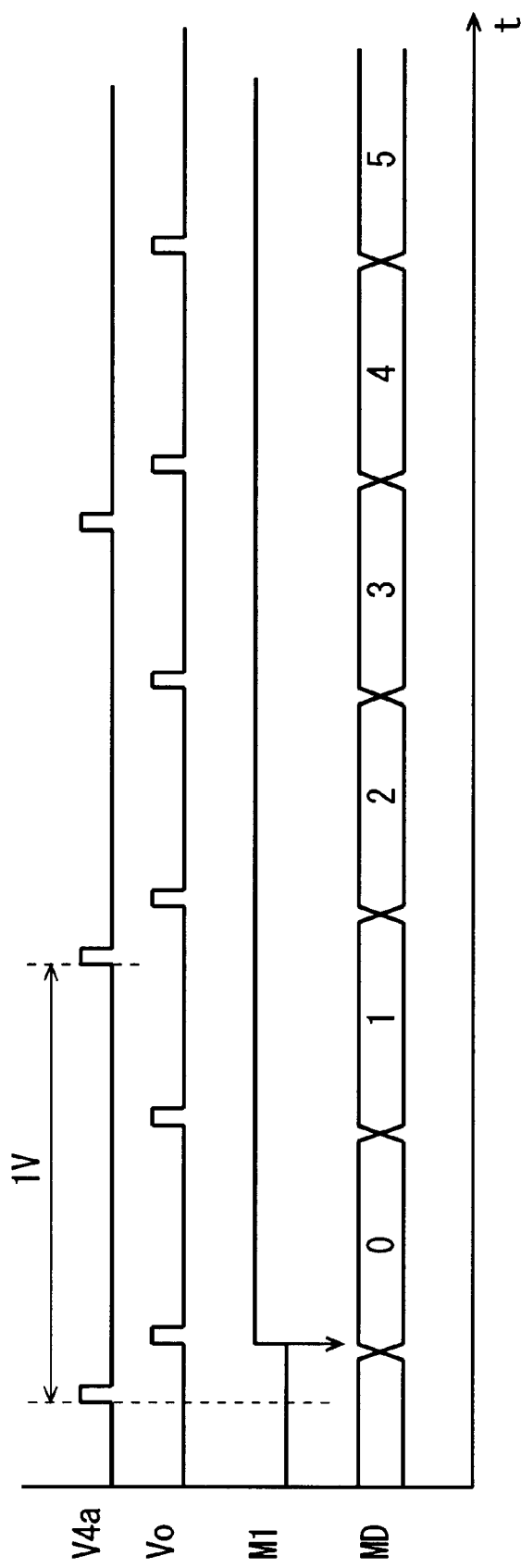
FIG. 21 is a timing chart for illustrating operations of the mode promotion even/odd determination circuit shown in FIG. 19.

FIGS. 20 and 21 are timing charts for illustrating operations of the mode promotion even/odd determination circuit 78 shown in FIG. 19.

FIG. 20 is a timing chart showing operations of the reciprocation control processing part 70 in relation to the vertical scanning frequency of 60 Hz. FIG. 21 is a timing chart showing operations of the reciprocation control processing part 70 in relation to the vertical scanning frequency of 120 Hz.

Referring to FIGS. 20 and 21, the cycle of the vertical synchronizing signal V4a corresponds to one vertical scanning period. When the vertical scanning frequency is 60 Hz, the vertical synchronizing signal Vo has the same cycle as the vertical synchronizing signal V4a, as shown in FIG. 20. When a control signal M1 rises, the value of the mode signal MD is sequentially counted up one by one from zero in synchronization with the vertical synchronizing signal Vo. The value of the mode signal MD indicates the number of a field.

When the vertical scanning frequency is 120 Hz, the cycle of the vertical synchronizing signal Vo is half that of the vertical synchronizing signal V4a, as shown in FIG. 21. When the control signal M1 rises, the value of the mode signal MD is sequentially counted up one by one from zero in synchronization with the vertical synchronizing signal Vo.

Figure 22:
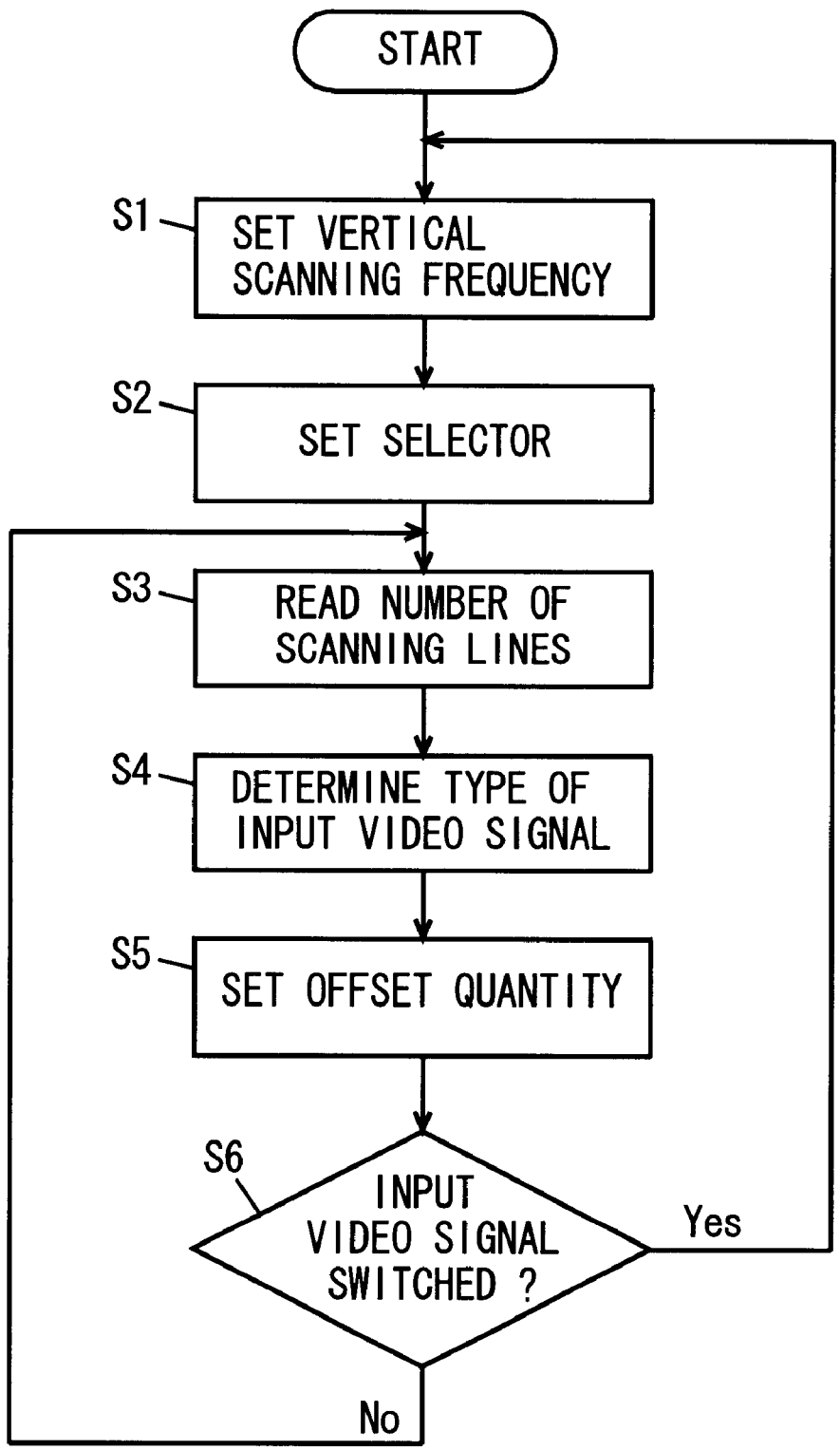
FIG. 22 is a flow chart showing operations of a CPU of FIG. 19.
Figure 23:
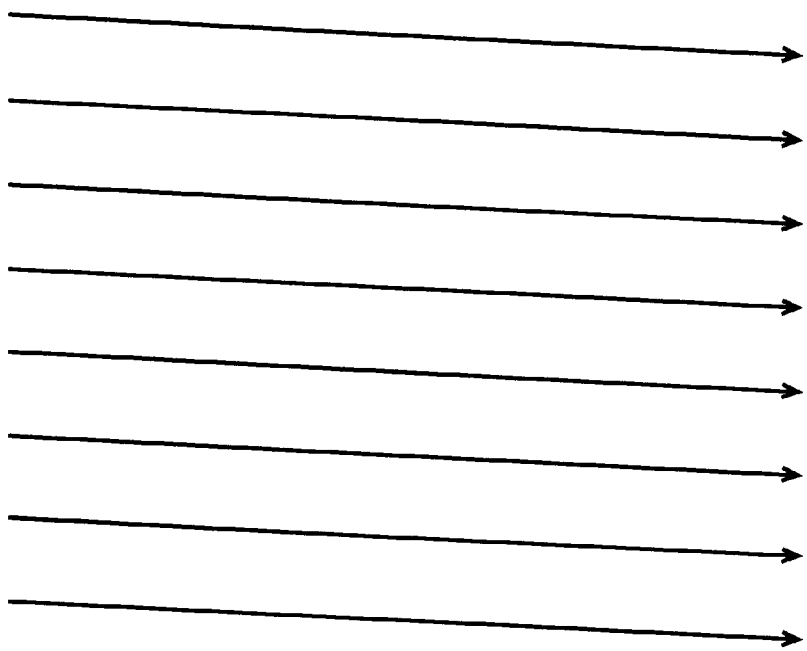
FIG. 23 illustrates a conventional unidirectional progressive scanning system.
Figure 24:
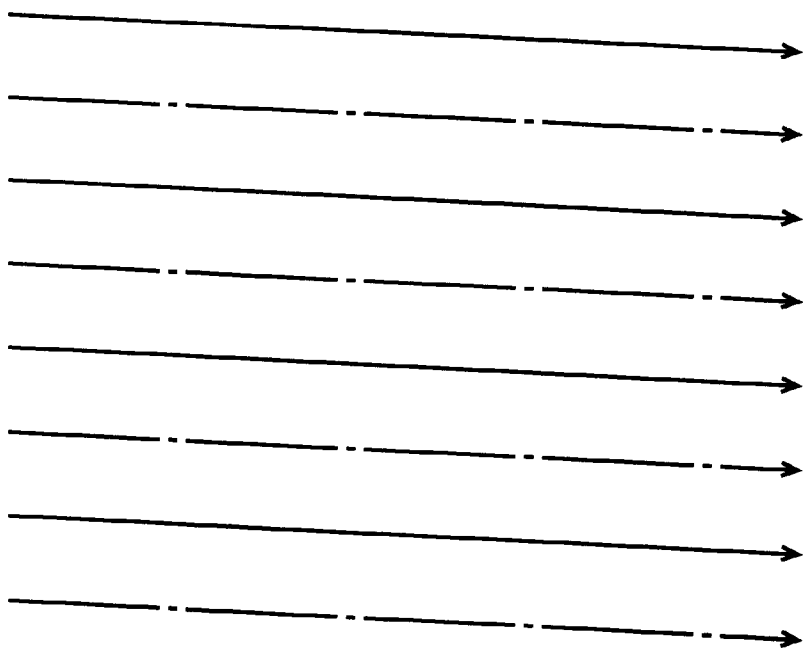
FIG. 24 illustrates a conventional unidirectional interlaced scanning system.
Figure 25:
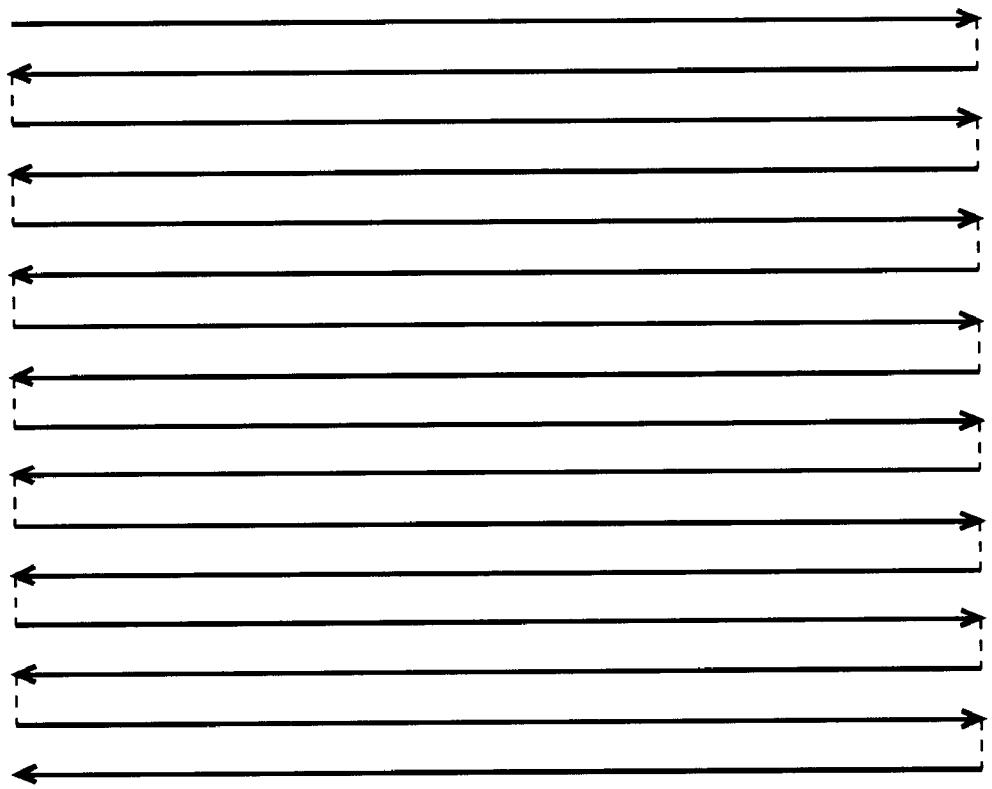
FIG. 25 illustrates a bidirectional progressive scanning system.

FIG. 22 is a flow chart showing operations of the CPU 81 shown in FIG. 19.

First, the CPU 81 sets the vertical scanning frequency of 60 Hz or 120 Hz in a register on the basis of user setting (step S1). Then, the CPU 81 sets the selector 79 with the switching signal SL on the basis of the vertical scanning frequency set in the register (step S2).

Thereafter the CPU 81 reads the number of scanning lines in one field on the basis of the scanning line number signal LN output from the scanning line number output part 77 (step S3). Then, the CPU 81 determines the type of the input video signal on the basis of the read number of scanning lines (step S4). Further, the CPU 81 sets the offset quantity OF on the basis of the type of the input video signal, and supplies the offset quantity OF to the V pulse offset processing part 80 (step S5).

The CPU 81 determines whether or not the input video signal has been switched (step S6). If the input video signal has been switched, the CPU 81 returns to the step S1 to set the vertical scanning frequency. If the input video signal has not been switched, the CPU 81 returns to the step S3 to read the number of scanning lines.

Thus, the CPU 81 supplies the offset quantity OF responsive to the type of the input video signal and the vertical scanning frequency to the V pulse offset processing part 80. Thus, the vertical synchronizing signal is subjected to offset processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video display apparatus comprising:
    a conversion circuit receiving a first video signal of an interlaced scanning system or a progressive scanning system including a first number of scanning lines in each frame and having a first vertical scanning frequency and converting said first video signal to a second video signal of a progressive scanning system including a second number of scanning lines in each frame and having a second vertical scanning frequency, wherein said second vertical scanning frequency is equal to said first vertical scanning frequency;
    a scanning line reversion circuit alternately reversing the time base of said second video signal output from said conversion circuit every scanning line and outputting processed said second video signal as a third video signal; and
    a display part displaying said third video signal output from said scanning line reversion circuit by bidirectional scanning in synchronization with a vertical synchronizing signal and a horizontal synchronizing signal after conversion by said conversion circuit.

2. A video display apparatus comprising:
    a conversion circuit receiving a first video signal of an interlaced scanning system or a progressive scanning system including a first number of scanning lines in each frame and having a first vertical scanning frequency and converting said first video signal to a second video signal of a progressive scanning system including a second number of scanning lines in each frame and having a second vertical scanning frequency, wherein said second vertical scanning frequency is even times said first vertical scanning frequency;
    a scanning line reversion circuit alternately reversing the time base of said second video signal output from said conversion circuit every scanning line and outputting processed said second video signal as a third video signal;
    a display part displaying said third video signal output from said scanning line reversion circuit by bidirectional scanning in synchronization with a vertical synchronizing signal and a horizontal synchronizing signal after conversion by said conversion circuit; and
    a second offset circuit displacing said vertical synchronizing signal so that a plurality of fields included in each frame keep interlaced relation.

3. The video display apparatus in accordance with claim 2, wherein
    said second vertical scanning frequency is twice said first vertical scanning frequency, and
    said second offset circuit displaces said vertical synchronizing signal by a second offset time every other field of each frame.

4. The video display apparatus in accordance with claim 3, wherein
    said second offset time is ¼ a horizontal scanning period.

5. A video display apparatus comprising:
    a conversion circuit receiving a first video signal of an interlaced scanning system or a progressive scanning system including a first number of scanning lines in each frame and having a first vertical scanning frequency and converting said first video signal to a second video signal of a progressive scanning system including a second number of scanning lines in each frame and having a second vertical scanning frequency, wherein said first video signal is of an interlaced scanning system, said first number is an odd number, said first vertical scanning frequency is even times said second vertical scanning frequency, and each frame includes a plurality of fields;
    a scanning line reversion circuit alternately reversing the time base of said second video signal output from said conversion circuit every scanning line and outputting processed said second video signal as a third video signal;
    a display part displaying said third video signal output from said scanning line reversion circuit by bidirectional scanning in synchronization with a vertical synchronizing signal and a horizontal synchronizing signal after conversion by said conversion circuit; and a third offset circuit displacing said vertical synchronizing signal so that said plurality of fields of each frame keep interlaced relation.

6. A video display method comprising steps of:

receiving a first video signal of an interlaced scanning system or a progressive scanning system including a first number of scanning lines in each frame and having a first vertical scanning frequency and converting said first video signal to a second video signal of a progressive scanning system including a second number of scanning lines in each frame and having a second vertical scanning frequency, wherein said second vertical scanning frequency is equal to said first vertical scanning frequency;

alternately reversing the time base of said second video signal every scanning line and outputting processed said second video signal as a third video signal; and displaying said third video signal by bidirectional scanning in synchronization with a vertical synchronizing signal and a horizontal synchronizing signal after conversion.

7. A video display method comprising steps of:

receiving a first video signal of an interlaced scanning system or a progressive scanning system including a first number of scanning lines in each frame and having a first vertical scanning frequency and converting said first video signal to a second video signal of a progressive scanning system including a second number of scanning lines in each frame and having a second vertical scanning frequency, wherein said second vertical scanning frequency is even times said first vertical scanning frequency;

alternately reversing the time base of said second video signal every scanning line and outputting processed said second video signal as a third video signal;

displaying said third video signal by bidirectional scanning in synchronization with a vertical synchronizing signal and a horizontal synchronizing signal after conversion; and displacing said vertical synchronizing signal so that a plurality of fields included in each frame keep interlaced relation.

8. The video display method in accordance with claim 7, wherein said second vertical scanning frequency is twice said first vertical scanning frequency, and said step of displacing said vertical synchronizing signal includes a step of displacing said vertical synchronizing signal by a second offset time every other field of each frame.

9. The video display method in accordance with claim 8, wherein said second offset time is ¼ a horizontal scanning period.

10. A video display method comprising steps of:

receiving a first video signal of an interlaced scanning system or a progressive scanning system including a first number of scanning lines in each frame and having a first vertical scanning frequency and converting said first video signal to a second video signal of a progressive scanning system including a second number of scanning lines in each frame and having a second vertical scanning frequency, wherein said first video signal is of an interlaced scanning system, said first number is an odd number, said first vertical scanning frequency is even times said second vertical scanning frequency, and each frame includes a plurality of fields;

alternately reversing the time base of said second video signal every scanning line and outputting processed said second video signal as a third video signal;

displaying said third video signal by bidirectional scanning in synchronization with a vertical synchronizing signal and a horizontal synchronizing signal after conversion; and displacing said vertical synchronizing signal so that said plurality of fields of each frame keep interlaced relation.

* * * * *